(12) United States Patent
Wirth

(10) Patent No.: US 9,481,406 B2
(45) Date of Patent: Nov. 1, 2016

(54) DRAG REDUCTION DEVICE AND A VEHICLE COMPRISING THE DEVICE

(71) Applicant: WR Industria Limited, Bicester Oxfordshire (GB)

(72) Inventor: Nicholas J P Wirth, Northamptonshire (GB)

(73) Assignee: WR Industria Limited, Bicester Oxfordshire (GB)

( * ) Notice: Subject to any disclaimer, the term of this patent is extended or adjusted under 35 U.S.C. 154(b) by 0 days.

(21) Appl. No.: 14/375,728

(22) PCT Filed: Jan. 30, 2013

(86) PCT No.: PCT/GB2013/050196
§ 371 (c)(1),
(2) Date: Jul. 30, 2014

(87) PCT Pub. No.: WO2013/114101
PCT Pub. Date: Aug. 8, 2013

(65) Prior Publication Data
US 2015/0015027 A1    Jan. 15, 2015

(30) Foreign Application Priority Data

Jan. 30, 2012 (GB) .................................. 1201561.6

(51) Int. Cl.
*B62D 35/00* (2006.01)
(52) U.S. Cl.
CPC ........... *B62D 35/001* (2013.01); *B62D 35/005* (2013.01)
(58) Field of Classification Search
CPC ......... B60J 1/20; B60J 1/2002; B62D 35/00; B62D 35/001; B62D 35/005; B62D 35/008; B62D 35/02

USPC ........................................... 296/180.1, 180.2
See application file for complete search history.

(56) References Cited

U.S. PATENT DOCUMENTS

| 3,971,586 | A |   | 7/1976  | Saunders |
| 4,284,302 | A |   | 8/1981  | Drews |
| 4,408,792 | A |   | 10/1983 | Sullivan |
| 4,511,170 | A | * | 4/1985  | Sankrithi ................... 296/180.1 |
| 4,624,497 | A |   | 11/1986 | Tassin |
| 4,750,772 | A |   | 6/1988  | Haegert |
| 4,867,397 | A | * | 9/1989  | Pamadi ................ B62D 35/001 296/180.1 |
| 4,878,707 | A |   | 11/1989 | Meyers |

(Continued)

FOREIGN PATENT DOCUMENTS

| DE | 3202812 A1 | 8/1983 |
| DE | 3916692 A1 | 11/1990 |

(Continued)

OTHER PUBLICATIONS

UK Examination Report for Application No. GB1201561.6 dated Dec. 11, 2014.

(Continued)

*Primary Examiner* — Jason S Daniels
(74) *Attorney, Agent, or Firm* — Honigman Miller Schwartz and Cohn LLP

(57) ABSTRACT

A drag reduction device for a truck, comprising a vortex generator. The drag reduction device is arranged to cooperate with a front portion of the truck such that, in use, the vortex generator generates a vortex which is capable of suppressing a wake formed along a side of the truck.

36 Claims, 19 Drawing Sheets

(56) References Cited

U.S. PATENT DOCUMENTS

| | | | |
|---|---|---|---|
| 5,042,865 A | 8/1991 | O'Saben | |
| 5,340,190 A | 8/1994 | Engel | |
| 8,297,685 B2* | 10/2012 | Wolf et al. | 296/180.3 |
| 8,752,883 B2* | 6/2014 | Johnson | 296/180.1 |
| 2004/0026953 A1 | 2/2004 | Neel | |
| 2005/0040668 A1 | 2/2005 | Wood | |
| 2009/0248242 A1 | 10/2009 | Cohen et al. | |
| 2009/0250970 A1 | 10/2009 | Regnell et al. | |
| 2011/0241377 A1 | 10/2011 | Rogers et al. | |
| 2012/0104800 A1* | 5/2012 | Dimitriou et al. | 296/193.06 |

FOREIGN PATENT DOCUMENTS

| | | |
|---|---|---|
| DE | 4014577 C1 | 10/1991 |
| EP | 1767442 A2 | 3/2007 |
| FR | 2551714 A1 | 3/1985 |
| FR | 2769572 A1 | 4/1999 |
| GB | 2435246 A | 8/2007 |
| GB | 2450114 A | 12/2008 |
| GB | 2498810 A | 7/2013 |
| JP | 2070582 | 3/1990 |
| JP | 8230726 A1 | 9/1996 |
| JP | 11034935 | 2/1999 |
| JP | 11091642 A | 4/1999 |
| JP | 2004042784 A | 2/2004 |
| WO | WO-2006091147 A1 | 8/2006 |
| WO | WO-2007090146 A1 | 8/2007 |
| WO | WO-2011096873 A1 | 8/2011 |

OTHER PUBLICATIONS

International Search Report for PCT/GB2013/050196 dated Apr. 16, 2013.

U.K. Search Report for Application GB1201561.6 dated May 31, 2012.

http://wvvw.part20.eu/applications/cab/ dated Mar. 12, 2009.

U.K. Examination Report for Application GB1201561.6 dated Oct. 8, 2014.

* cited by examiner

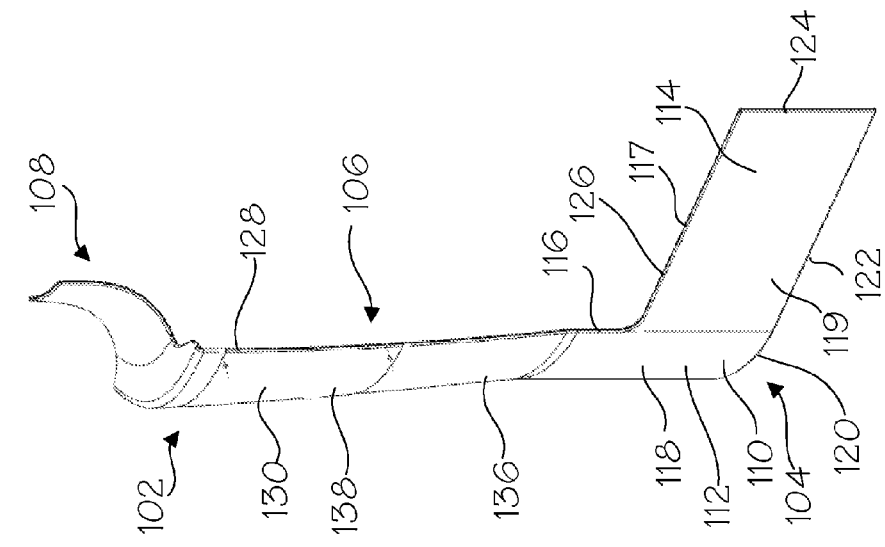
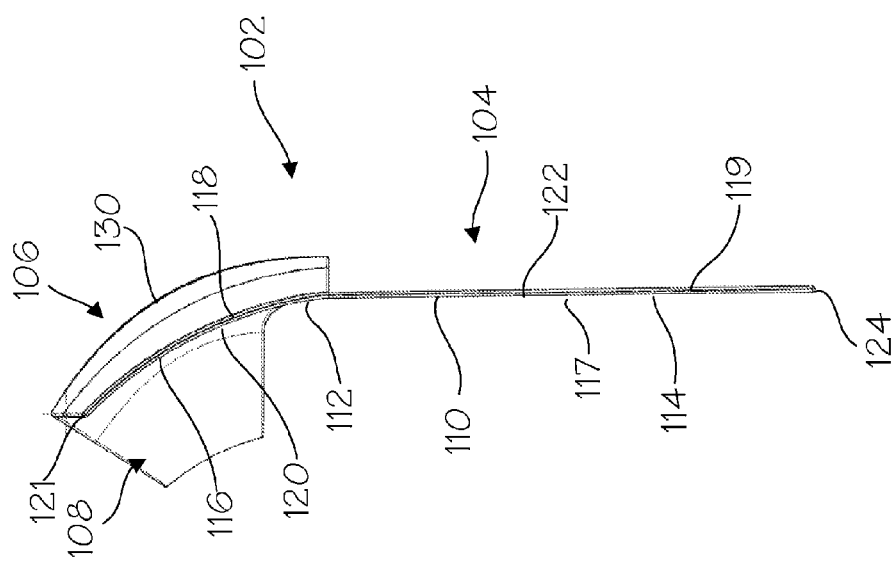

DRAG REDUCTION DEVICE AND A VEHICLE COMPRISING THE DEVICE

TECHNICAL FIELD

This invention relates to a drag reduction device for a truck, a vehicle comprising the drag reduction device and a method of operating the vehicle. The invention particularly, but not exclusively, relates to a drag reduction device for a haulage truck comprising a tractor and a trailer.

BACKGROUND

It is known that reducing the amount of drag which acts on a vehicle improves the fuel consumption of the vehicle. Reducing the drag which acts on haulage vehicles, such as trucks, is therefore particularly desirable since any saving in fuel, as a consequence of the improved fuel consumption, translates into a saving in haulage costs.

It is known that the amount of drag which acts on a vehicle can be reduced by streamlining a vehicle. To this end, various aerodynamic devices such as fairings and deflectors have been fixed to trucks. Examples of such devices are described in U.S. Pat. No. 4,624,497, U.S. Pat. No. 4,750,772 and WO 2006091147.

However, trucks are generally used to carry bulky cargos. Consequently, the extent to which a truck can be streamlined is limited. Furthermore, known aerodynamic devices are designed to be most effective when a truck is operating in still air or a direct headwind/tailwind. Consequently, any benefits provided by the streamlining devices are often lost when the truck is operated in a crosswind.

SUMMARY

According to a first aspect of the invention there is provided a drag reduction device for a truck, comprising a vortex generator, the drag reduction device being arranged to cooperate with a front portion of the truck such that, in use, the vortex generator generates a vortex which is capable of suppressing a wake formed along a side of the truck.

The device may be arranged to cooperate with the truck such that the vortex generator generates the vortex at a lower region of the front of the truck, for example below a body of the truck.

The device may be arranged to cooperate with the truck such that the vortex generator generates a vortex which rotates about a nominal vortex axis, wherein the vortex axis extends in the longitudinal direction of the truck.

The device may be arranged to cooperate with the truck such that the vortex generator generates the vortex outboard of the truck.

The device may be arranged to cooperate with the truck such that the vortex generator generates the vortex in front of a front wheel of the truck which is capable of suppressing a wake of the wheel.

The vortex generator may comprise a vortex generating vane having a vortex generating edge. The vortex generating edge may be a lower edge of the vortex generating vane.

The device may be arranged to cooperate with the truck such that at least a portion of the vortex generating edge extends rearwardly with respect to the truck. Said portion of the vortex generating edge may be straight. The device may be further arranged to cooperate with the truck such that said portion of the vortex generating edge extends in a substantially longitudinal direction of the truck.

The device may be arranged to cooperate with the truck such that said portion of the vortex generating edge extends to a position which is adjacent a front wheel arch of the truck. Said portion of the vortex generating edge may be at least 10 cm and not more than 100 cm in length.

The vortex generating vane may comprise a leading portion and a trailing portion, the leading portion being profiled, for example curved, to direct flow over the trailing portion. The trailing portion may be substantially planar.

The device may further comprise a coupling for coupling the drag reduction device to the truck.

The device may further comprise a turning vane, wherein the device is arranged to cooperate with the truck such that the turning vane directs flow around a front corner of the truck to inhibit flow separation from the corner of the truck. At least a portion of the device may be transparent or translucent.

The device may be arranged to cooperate with the truck such that a light, for example an indicator or side light, provided on the truck is visible through the translucent/transparent portion of the device.

According to a second aspect of the invention there is provided a vehicle comprising a drag reduction device in accordance with the first aspect of the invention, wherein the device cooperates with a front portion of the vehicle such that, in use, the vortex generator generates a vortex for suppressing a wake formed along a side of the vehicle.

The vehicle may comprise at least two drag reduction devices, each device being in accordance with the first aspect of the invention, wherein the devices are arranged on opposite sides of the vehicle.

The vehicle may further comprise at least one of the following: a further drag reduction device arranged on the underside of the vehicle, a cabin turning vane, a mirror fairing, a spoiler which is arranged to cooperate with a front lower peripheral edge of the vehicle, a wheel arch extension, a roof spoiler, a cabin deflector and a wheel arch panel suitably arranged.

According to a third aspect of the invention there is provided a method of operating a vehicle in accordance with the second aspect of the invention, wherein the method comprises the step of moving the vehicle over a predetermined distance such that the vortex generator generates a vortex.

According to a fourth aspect of the invention there is provided a drag reduction device for a truck, comprising an elongate strake having an outboard aerodynamic surface, wherein the drag reduction device is configured to cooperate with the underside of the truck such that the outboard aerodynamic surface faces outboard and extends from an inboard position in a rearward and outboard direction with respect to the truck.

The device may be configured to cooperate with the underside of the truck such that, in use, the outboard aerodynamic surface directs flow from underneath the truck outwardly towards a side of the truck.

The device may be configured to cooperate with the underside of the truck such that, in use, the outboard aerodynamic surface directs flow outwardly with respect to a wheel of the truck, for example a rear wheel of the truck.

The drag reduction device may be configured to cooperate with the underside of the truck such that at least part of the outboard aerodynamic surface is curved in the outboard and rearward direction with respect to the truck. The outboard aerodynamic surface may be curved in the outboard and rearward direction such that the outboard aerodynamic surface is concave.

The outboard aerodynamic surface may have a lower edge, the drag reduction device being configured to cooperate with the underside of the truck such that the aerodynamic surface extends in an upward direction from the lower edge with respect to the truck.

The drag reduction device may be configured to cooperate with the underside of the truck such that at least part of the outboard aerodynamic surface extends in an upward and outboard direction with respect to the truck.

The drag reduction device may be configured to cooperate with the underside of the truck such that the outboard aerodynamic surface extends from the lower edge to a peripheral edge of the truck.

The strake may comprise an inboard aerodynamic surface, wherein the drag reduction device is configured to cooperate with the underside of the truck such that the inboard aerodynamic surface faces inboard and extends in a rearward direction with respect to the truck. The inboard aerodynamic surface and the outboard aerodynamic surface may diverge in the rearward direction.

The device may be configured to cooperate with the said underside of the truck such that, in use, the outboard aerodynamic surface directs flow outwardly of a rear wheel of the truck. The device may be further configured to cooperate with the said underside of the truck such that, in use, the inboard aerodynamic surface directs flow inwardly of the rear wheel of the truck.

The device may further comprise an impact structure. The impact structure may extend along at least part of the strake and projects outwardly from the outboard aerodynamic surface. The impact structure may comprise at least one rail.

The device may be configured such that, when the device is arranged on the underside of the truck, at least part of the outboard aerodynamic surface is disposed below the rail.

According to a fifth aspect of the invention there is provided a vehicle comprising a drag reduction device in accordance with the fourth aspect of the invention, wherein the drag reduction device is arranged to cooperate with the underside of the vehicle such that the outboard aerodynamic surface faces outboard and extends from an inboard position in a rearward and outboard direction with respect to the vehicle.

The vehicle may comprise at least two drag reduction devices, each device being in accordance with the fourth aspect of the invention, wherein the devices are arranged on opposite sides of the vehicle.

The vehicle may further comprise at least one of the following: further drag reduction device arranged to cooperate with a front portion of the vehicle, a cabin turning vane, a mirror fairing, a spoiler which is arranged to cooperate with a front lower peripheral edge of the vehicle, a wheel arch extension, a roof spoiler, a cabin deflector and a wheel arch panel suitably arranged.

According to a sixth aspect of the invention there is provided a trailer comprising a drag reduction device in accordance with the fourth aspect of the invention, wherein the drag reduction device is configured to cooperate with the underside of the trailer such that the outboard aerodynamic surface faces outboard and extends from an inboard position in a rearward and outboard direction with respect to the trailer.

According to a seventh aspect of the invention there is provided a method of operating a vehicle in accordance with the fifth aspect of the invention, wherein the method comprises the step of moving the vehicle over a predetermined distance.

According to an eighth aspect of the invention there is provided drag reduction device for a truck, comprising a spoiler, the drag reduction device being configured to cooperate with a front lower peripheral edge of the truck such that, in use, the spoiler inhibits flow under the front lower peripheral edge of the truck in the longitudinal direction of the truck.

The spoiler may be further configured to cooperate with the front lower peripheral edge of the truck such that, in use, the spoiler acts on flow in the longitudinal direction of the truck to reduce the total pressure of the flow downstream of the spoiler.

The spoiler may further comprise a fence, the spoiler being further configured to cooperate with the front lower peripheral edge of the truck such that the fence extends along at least part of the front peripheral edge of the truck. The fence may be configured such that the fence extends along the entire length of the front peripheral edge of the truck.

The spoiler may be further configured to cooperate with the front lower peripheral edge of the truck such that the fence projects downwardly from the front peripheral edge of the truck.

The fence may have a continuous forward facing surface, wherein the spoiler is further configured to cooperate with the front lower peripheral edge of the truck such that the forward facing surface faces in a forward direction with respect to the truck.

The spoiler may be further configured to cooperate with the front lower peripheral edge of the truck such that the forward facing surface extends from the front lower peripheral edge of the truck in a downward and forward direction. At least part of the forward facing surface may extend concavely in the downward and forward direction.

The fence may comprise end portions, the spoiler being further configured to cooperate with the front lower peripheral edge of the truck such that the end portions extend rearwardly from a front portion of the fence along respective side peripheral edges of the truck.

According to a ninth aspect of the invention there is provided a vehicle comprising a drag reduction in accordance with the eighth aspect of the invention.

The vehicle may further comprise at least one of the following: a further drag reduction device arranged to cooperate with a front portion of the vehicle, a drag reduction device arranged on the underside of the vehicle, a cabin turning vane, a mirror fairing, a wheel arch extension, a roof spoiler, a cabin deflector and a wheel arch panel suitably arranged According to a tenth aspect of the invention there is provided a method of operating a vehicle in accordance with the ninth aspect of the invention, wherein the method comprises the step of moving the vehicle over a predetermined distance.

For a better understanding of the present invention, and to show more clearly how it may be carried into effect, reference will now be made, by way of example, to the accompanying drawings, in which:

BRIEF DESCRIPTION OF THE DRAWINGS

FIG. 8 is a bottom view of the first drag reduction device in isolation;

FIG. 9 is a perspective view of the drag reduction device shown in FIG. 8;

DETAILED DESCRIPTION

Figure 1:
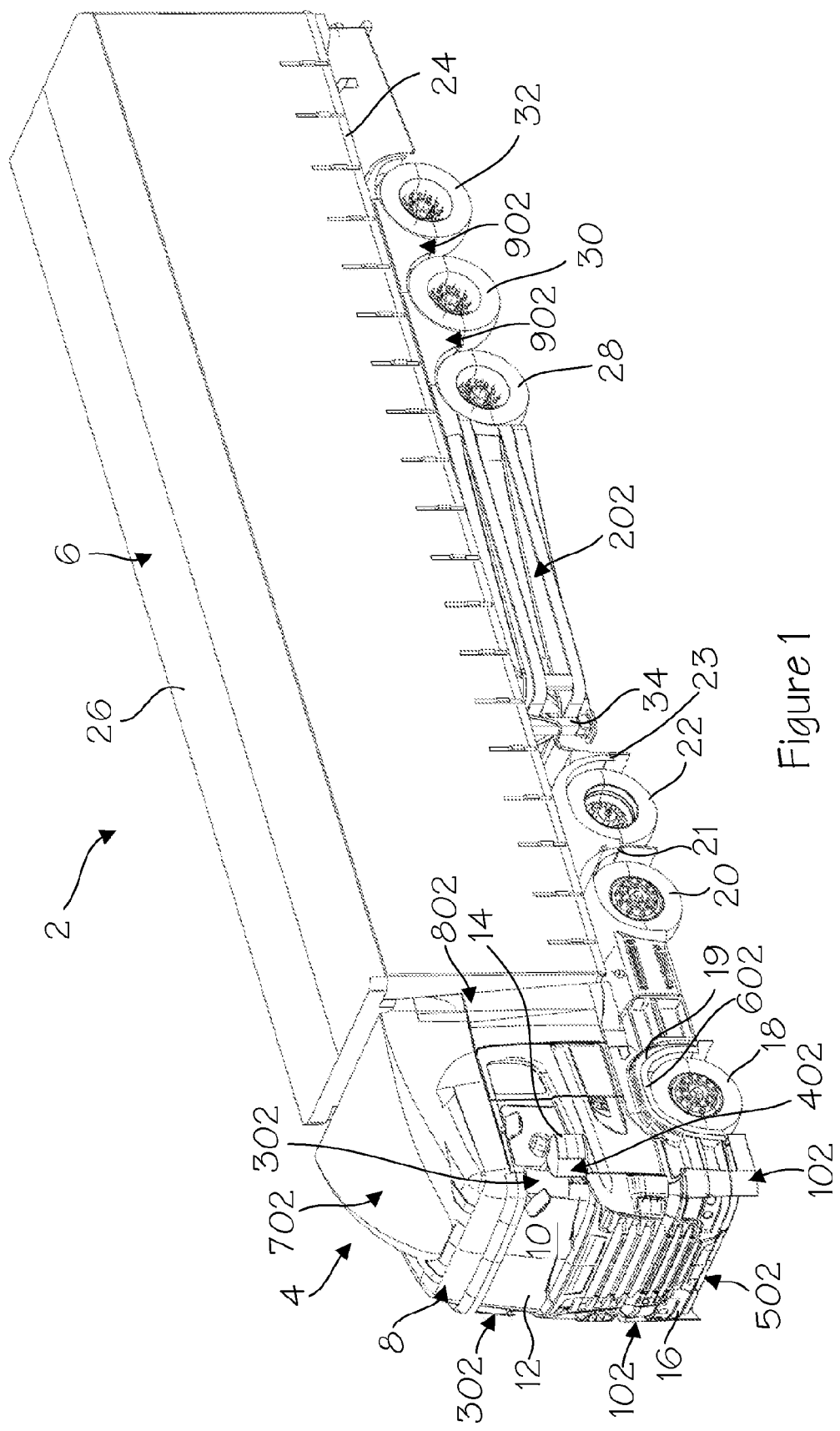
FIG. 1 is a perspective view of a truck.
Figure 2:
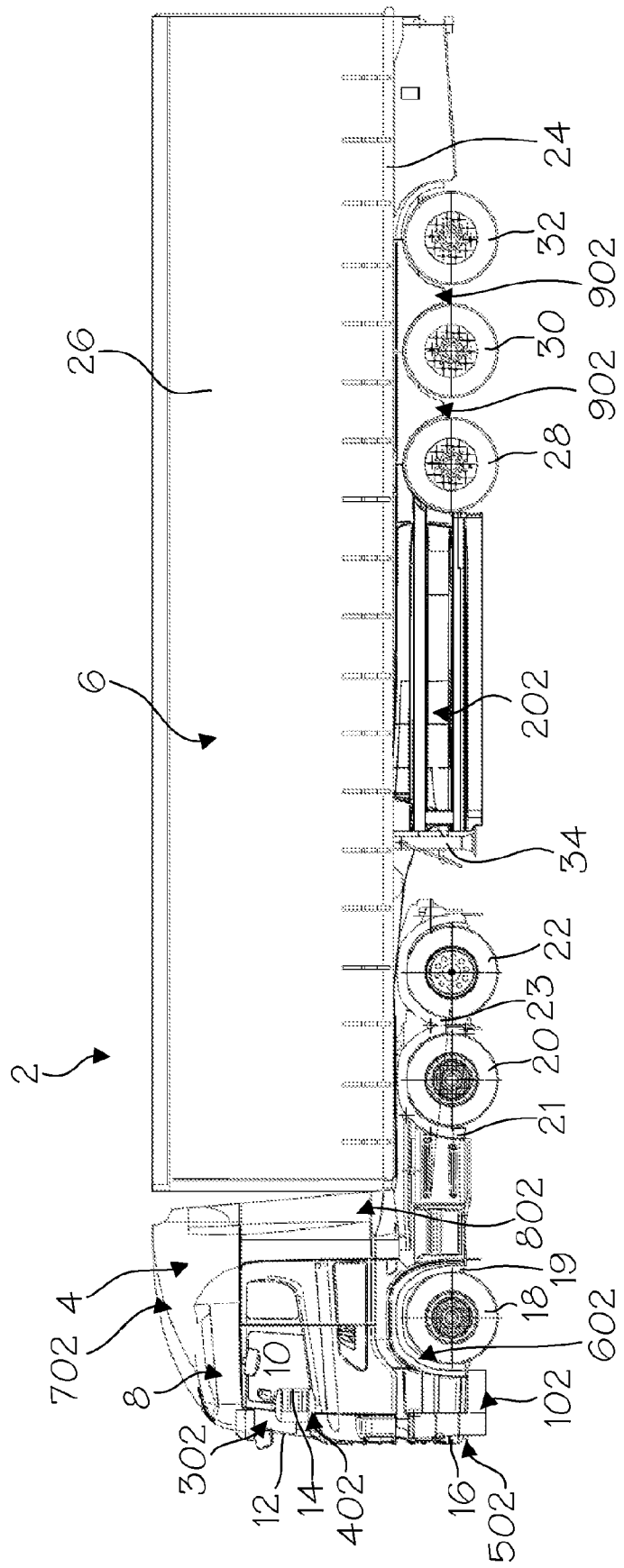
FIG. 2 is side elevation view of the truck shown in FIG. 1.
Figure 3:
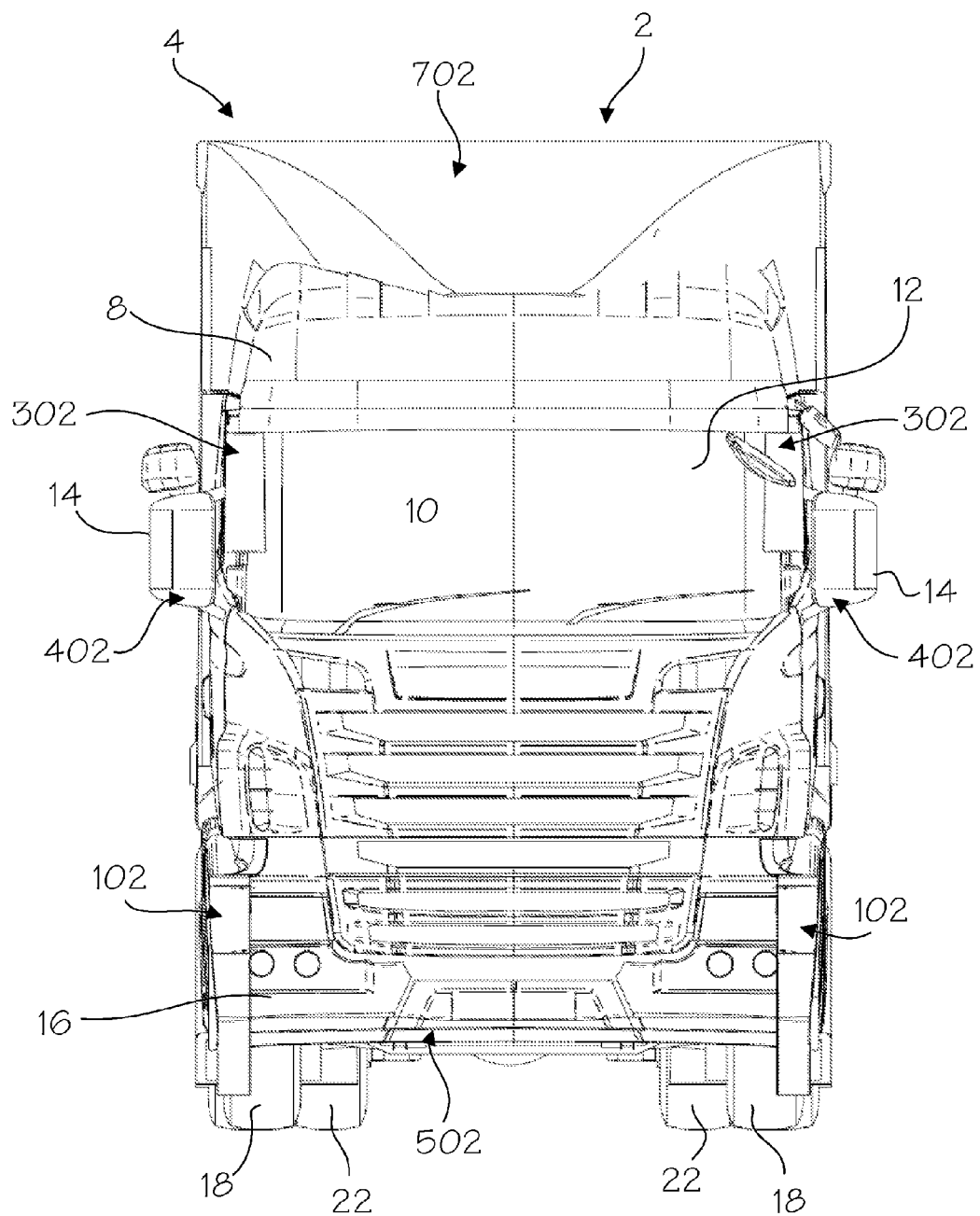
FIG. 3 is a front elevation view of the truck shown in FIG. 1.
Figure 4:
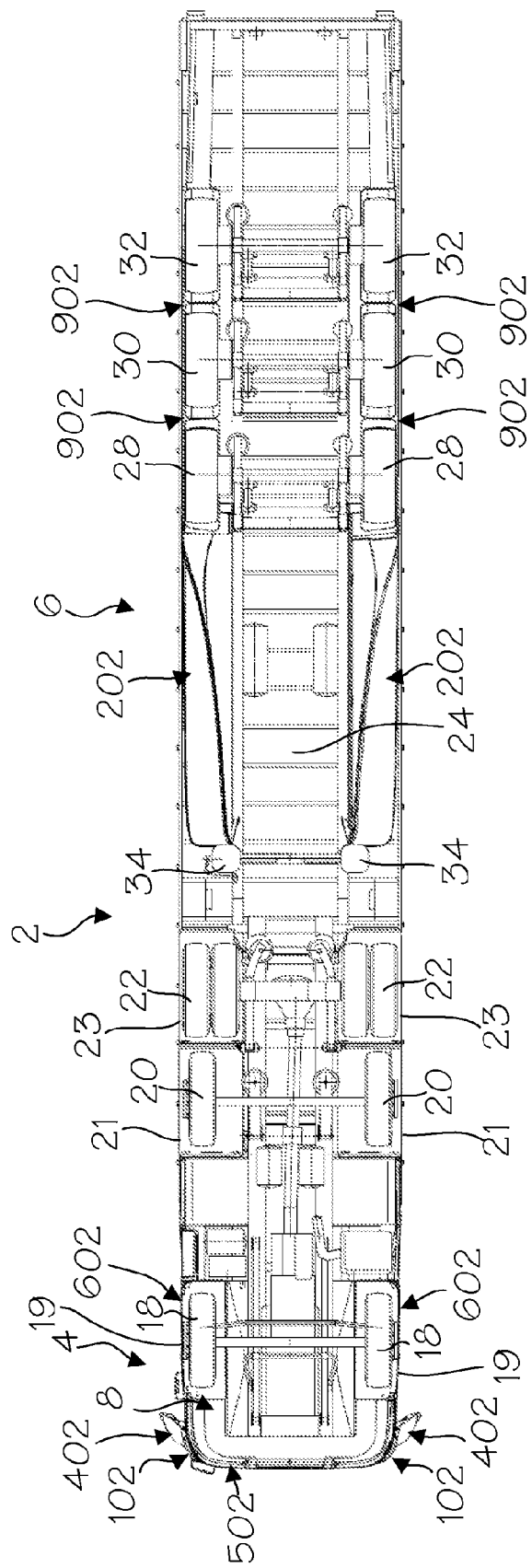
FIG. 4 is a bottom view of the truck shown in FIG. 1.
Figure 5:
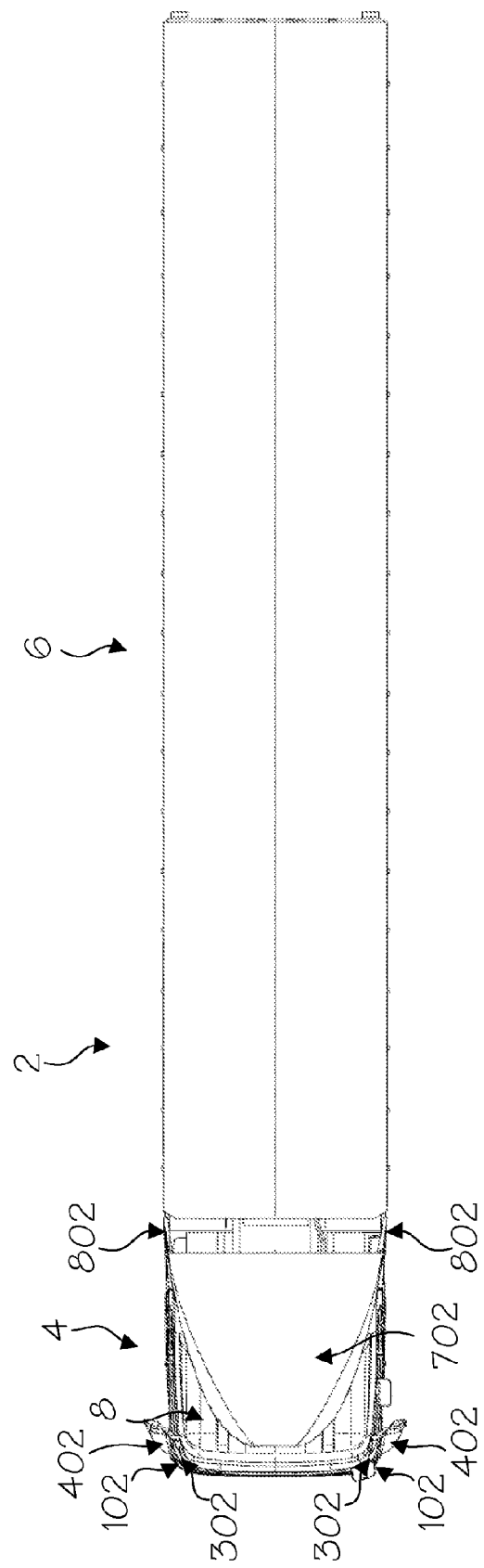
FIG. 5 is a top view of the truck shown in FIG. 1.

FIGS. 1 to 5 show a vehicle in the form of a truck 2, such as a haulage truck, comprising a tractor 4 and a trailer 6. The trailer 6 is coupled to the tractor 4 by an articulated coupling (not shown), for example a hitch, which allows the tractor 4 to turn independently of the trailer 6. The tractor 4 comprises a tractor body 8 comprising a cabin 10 for a driver, a windscreen 12 at the front of the tractor 4, side mirrors 14 on respective sides of the tractor 4 and a bumper 16 at the lower front region of the tractor 4. The tractor 4 has two front wheels 18 and four rear wheels 20, 22. The front wheels 18 are disposed respectively on opposite sides of the tractor 4. Two rear wheels 20, 22 are disposed on each side of the tractor 4. In the embodiment shown, each of the rearmost wheels 22 of the tractor 4 comprises a double wheel arrangement. Wheel arches 19, 21, 23 extend over the respective wheels 18, 20, 22.

In the embodiment shown, the front lower portion of the tractor 4 is the region of the tractor 4 forward of the front wheels 18 and below the top of the wheels arches 19 of the front wheels 18.

The trailer 6 comprises a loading bed 24, a canopy 26, six wheels 28, 30, 32 at the rear of the trailer 6, three wheels being disposed on each side of the trailer 6, and landing gear 34 positioned forward of the wheels 28, 30, 32 for supporting the trailer 6 when the trailer 6 is decoupled from the tractor 4.

The truck 2 further comprises a kit of drag reducing components. The drag reducing components include:

a pair of first drag reduction devices 102 disposed at the front lower region of the tractor 4;

a pair of second drag reduction devices 202 disposed on the underside of the trailer 6;

a pair of cabin turning vanes 302 disposed adjacent the wind screen 12;

a pair of mirror fairings 402 disposed at the side mirrors 14;

a spoiler 502 which extends downwardly from the front of the tractor 4;

a pair of wheel arch extensions 602 disposed on the wheel arches 19 of the front wheels 18 of the tractor 4;

a roof spoiler 702 disposed on the roof of the tractor 4;

a pair of cabin deflectors 802 disposed at the rear of the cabin 10; and wheel arch panels 902 disposed respectively between the rear wheels 28, 30, 32 of the trailer 6.

The vehicle may comprise only one of the drag reducing components, all of the drag reducing components or any combination of some of the drag reducing components.

Figure 6:
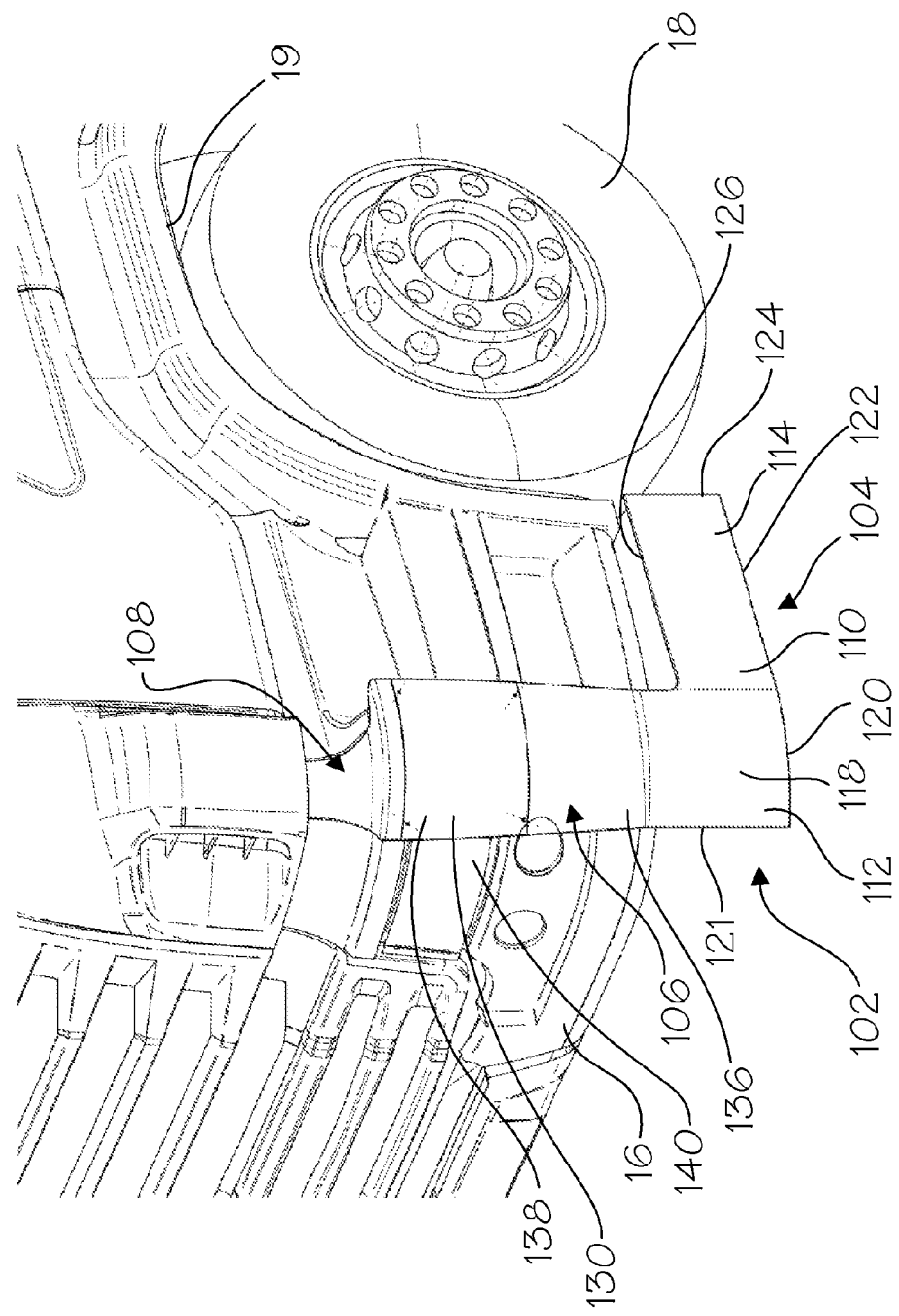
FIG. 6 is a partial perspective view of a truck corresponding to the truck shown in FIG. 1 in the region of a first drag reduction device.
Figure 7:
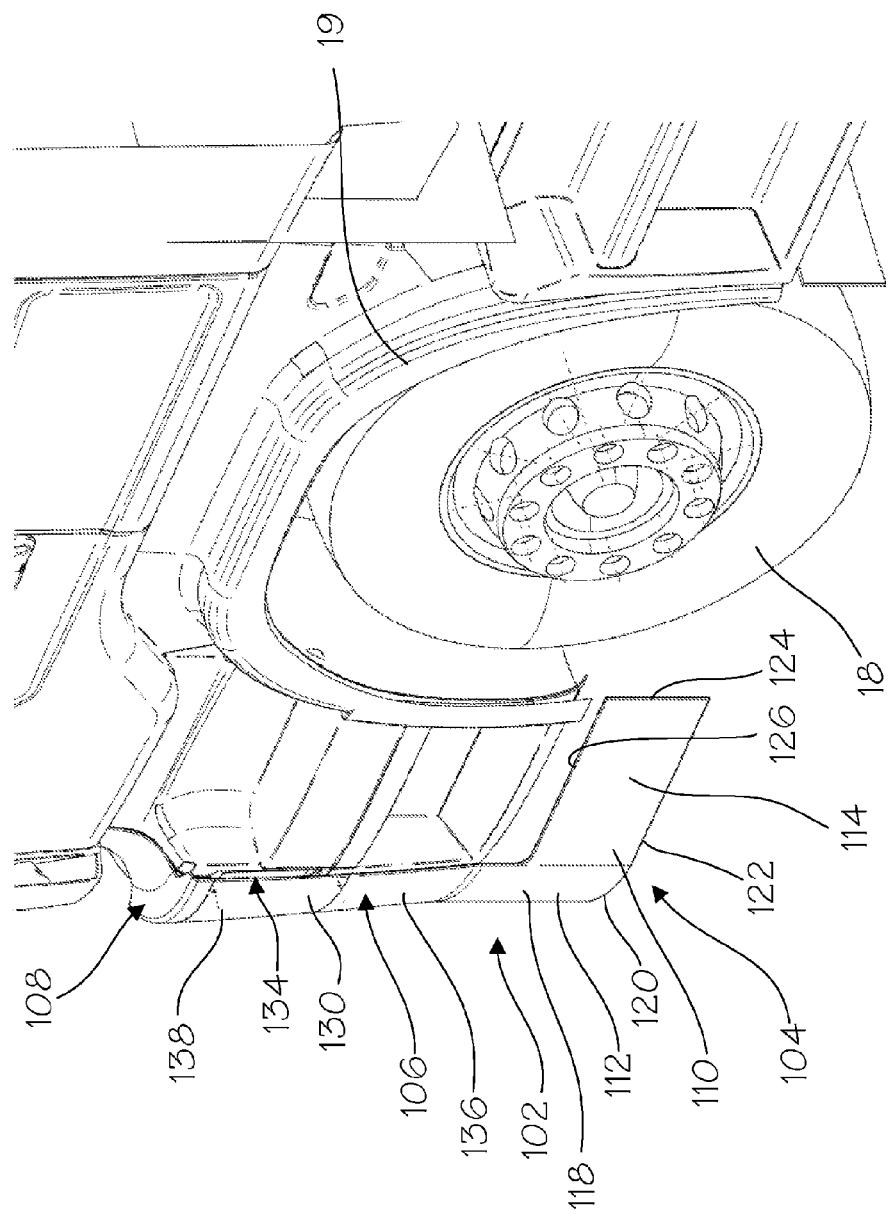
FIG. 7 is a partial perspective view of the region of the truck shown in FIG. 6 from a different perspective.

FIGS. 6 and 7 show one of the first drag reduction devices 102 coupled to the left-hand-side of the front of the tractor 4 in the vicinity of the bumper 16. FIGS. 8 and 9 show the drag reduction device 102 in isolation. The first drag reduction devices 102 are identical, although mirrored in construction, and are arranged to be fitted to opposite sides of the tractor 4. For ease of reference, only the left-hand-side drag reduction device 102 will be described.

The first drag reduction device 102 comprises a vortex generator 104, a turning vane 106 and a coupling 108 for coupling the drag reduction device 102 to the front of the tractor 4. The vortex generator 104, turning vane 106 and coupling 108 may be integrally formed, for example from a single piece of carbon fiber composite. It will be appreciated that they may also be fabricated from any suitable substantially rigid material, or may comprises separate panels joined together by a suitable joining means.

The vortex generator 104 comprises a vortex generating vane 110 having a leading portion 112 and a trailing portion 114. As shown in FIGS. 8 and 9, the leading portion 112 is curved such that the leading portion 112 has an inner concave surface 116 which faces towards the tractor 4 and an outer convex surface 118 which faces away from the tractor 4.

The trailing portion 114 is substantially planar and extends rearwardly from the leading portion 112 in a direction which is substantially parallel to the longitudinal direction of the tractor 4. The trailing portion 114 has a flat inner surface 117 and a flat outer surface 119. These surfaces 117, 119 adjoin the inner concave surface 116 and the outer convex surface 118 respectively.

The vortex generating vane 110 has a lower vortex generating edge 120, 122 which is a lower edge of the vane 110. The lower vortex generating edge has a first portion 120 and a second portion 122. The first portion 120 is a lower edge of the leading portion 112 that extends from a front edge 121 of the leading portion 112 to the trailing portion 114. The second portion 122 is a lower edge of the trailing portion 114 that extends from the leading portion 112 to a rear edge 124 of the trailing portion 114. The front edge 121 is the leading edge of the vortex generating vane 110. The rear edge 124 is the trailing edge of the vortex generating vane 110. The second portion 122 of the lower vortex generating edge 120, 122 is straight and extends substantially parallel to the longitudinal direction of the tractor 4.

The second portion 122 of the vortex generating edge extends rearwardly towards the wheel arch 19 of the front wheel 18 of the tractor 4. In the embodiment shown, the rear edge 124 is disposed at the front of the wheel arch 19 so that the trailing portion 114 does not interfere with access to the front wheel 18. It is anticipated that the length of the trailing portion 114 and/or the length of the lower vortex generating edge 120, 122 should be such that the trailing portion 114 and/or lower vortex generating edge 120, 122 extends rearwardly as far as possible, in accordance with constraints (for example to allow driver access or to comply with legislative requirements), so as to inhibit flow in the inboard and outboard direction in front of the front wheel 18 (i.e. to seal the region forward of the front wheel 18) as much as possible. It will be appreciated that the length of the trailing portion 114 and/or the length of the lower vortex generating edge 120, 122 is determined in accordance with the required performance characteristics of the first drag reduction device 102. For example, the length of the rear trailing portion 114 and/or the length of the lower vortex generating edge 120, 122 may be shortened to prevent flow separation from the vortex generating vane 110.

The trailing portion 114 has an upper vortex generating edge 126 which is an upper edge of the trailing portion 114. The upper vortex generating edge 126 extends from the leading portion 112 to the rear edge 124 of the trailing portion 114. In the embodiment shown, the upper vortex generating edge 126 is disposed below a foot well of the tractor 4 so that the trailing portion 114 does not obstruct driver access. It will be appreciated that in other embodiments the upper vortex generating edge 126 may be above the lower peripheral edge of the tractor 4.

The drag reduction device 102 is arranged such that the vortex generator 104 is disposed below the front of the tractor 4 in front of the front wheel 18 on the left-hand-side of the tractor 4.

The term "below the front of the truck/tractor" is, unless the context suggests otherwise, intended to mean at a level which is lower than the front portion of the tractor 4, whether underneath or spaced outwardly of the tractor 4. The purpose of arranging the vortex generator 104 below the tractor/truck is to minimize the disturbance of oncoming flow arriving at the vortex generator 104.

In the embodiment shown, the drag reduction device 102 is arranged such that the trailing portion 114 of the vortex generating vane 110 and the second portion 122 of the vortex generating edge extend in substantially the same vertical plane as the peripheral edge of the tractor 4 below which they are disposed. The vortex generator 104 is therefore arranged such that there are no parts of the tractor 4 which are disposed immediately in front of the vortex generator 104 which would produce a wake that would disturb with the oncoming airflow arriving at the front edge 121 of the leading portion 112 of the vortex generating vane 110.

The drag reduction device 102 may be further arranged such that the leading edge 121 of the vortex generating vane 110 is spaced rearwardly with respect to the front of the tractor 4.

It will be appreciated that, in other embodiments, the vortex generator 104 could be arranged such that the trailing portion 114 of the vortex generating vane 110 and/or the second portion 122 of the vortex generating edge 120, 122 are/is disposed slightly inboard or outboard of the side of the tractor 4. Furthermore, the vortex generator 104 may be arranged such that the lower vortex generating edge 120, 122 is disposed below the front of the tractor 4, the upper vortex generating edge 126 being disposed at or above the lower level of the front of the tractor 4. An example of such an arrangement is shown in FIGS. 1 to 5 in which the tractor 4 is fitted with the spoiler 502, shown in FIGS. 15 and 16, and the first drag reduction device 102.

The vortex generating vane 110 blends into the turning vane 106 at the top of the leading portion 112. The turning vane 106 is curved; having an inner concave surface 128 which faces towards the tractor 4 and an outer convex surface 130 which faces away from the tractor 4. The turning vane 106 extends upwardly, which in the embodiment shown is vertically upwardly, between the vortex generating vane 110 and the coupling 108. The turning vane 106 is spaced away from the tractor 4 in the outboard direction such that the concave surface 128 and a front portion of the tractor 4 (which in the embodiment shown is the bumper 16) define a flow passage 134 which extends around a front corner of the tractor 4.

The turning vane 106 comprises a lower panel 136 and an upper panel 138. The upper panel 138 is transparent and is disposed adjacent a side light 140 of the tractor 4, for example an indicator, so that the side light is visible from the side of the tractor 4 through the upper panel 138.

The coupling 108 engages with coupling features on the tractor 4, for example on the bumper 16, to secure the drag reduction device 102 to the tractor 4. The drag reduction device 102 is suspended from the tractor 4 by the coupling 108. In addition to the coupling 108, the first drag reduction device 102 may be secured to the tractor 4 at the lower portion of the turning vane 106 or at the vortex generating vane 110, for example by a mount between the bumper 16 and the turning vane 106, to inhibit flexing of the first drag reduction device 102 during use. This prevents the vortex generator 104 from being displaced in the outboard direction. The first drag reduction device 102 may be secured by bonding or mechanical fixings.

Figure 10:
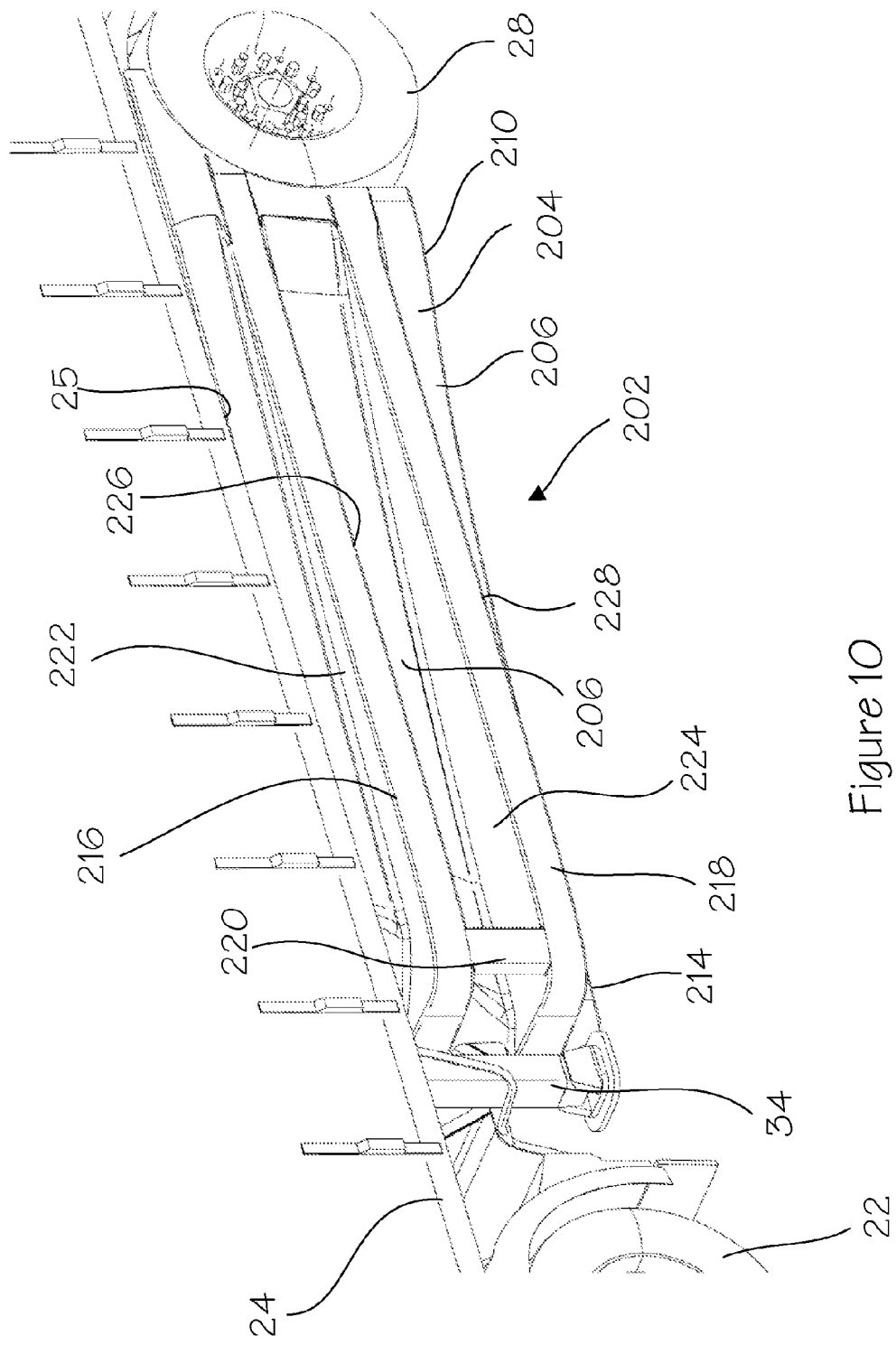
FIG. 10 is a partial perspective view of a truck corresponding to the truck shown in FIG. 1 in the region of a second drag reduction device.
Figure 11:
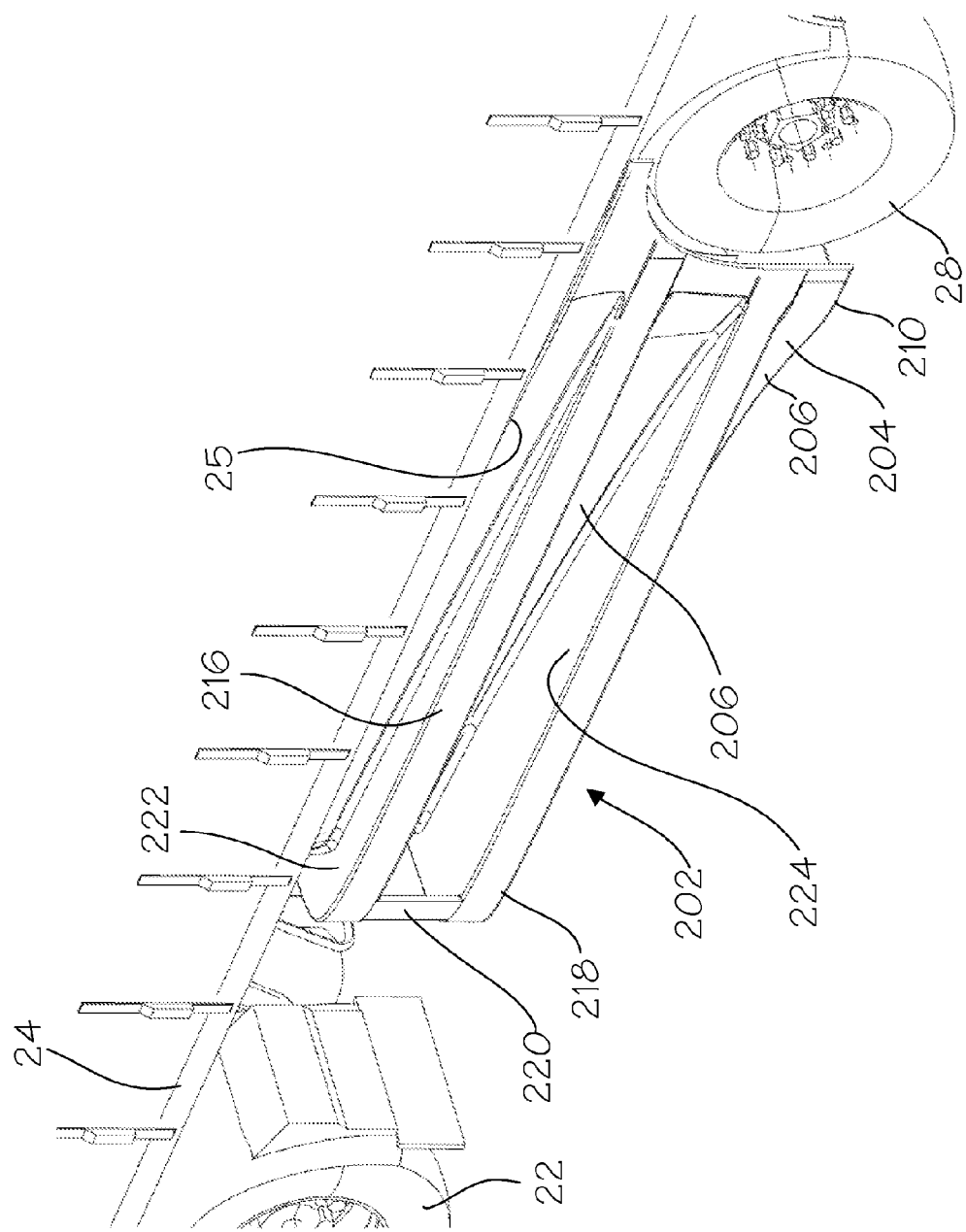
FIG. 11 is a partial perspective view of the region of the truck shown in FIG. 10 from a different perspective.
Figure 12:
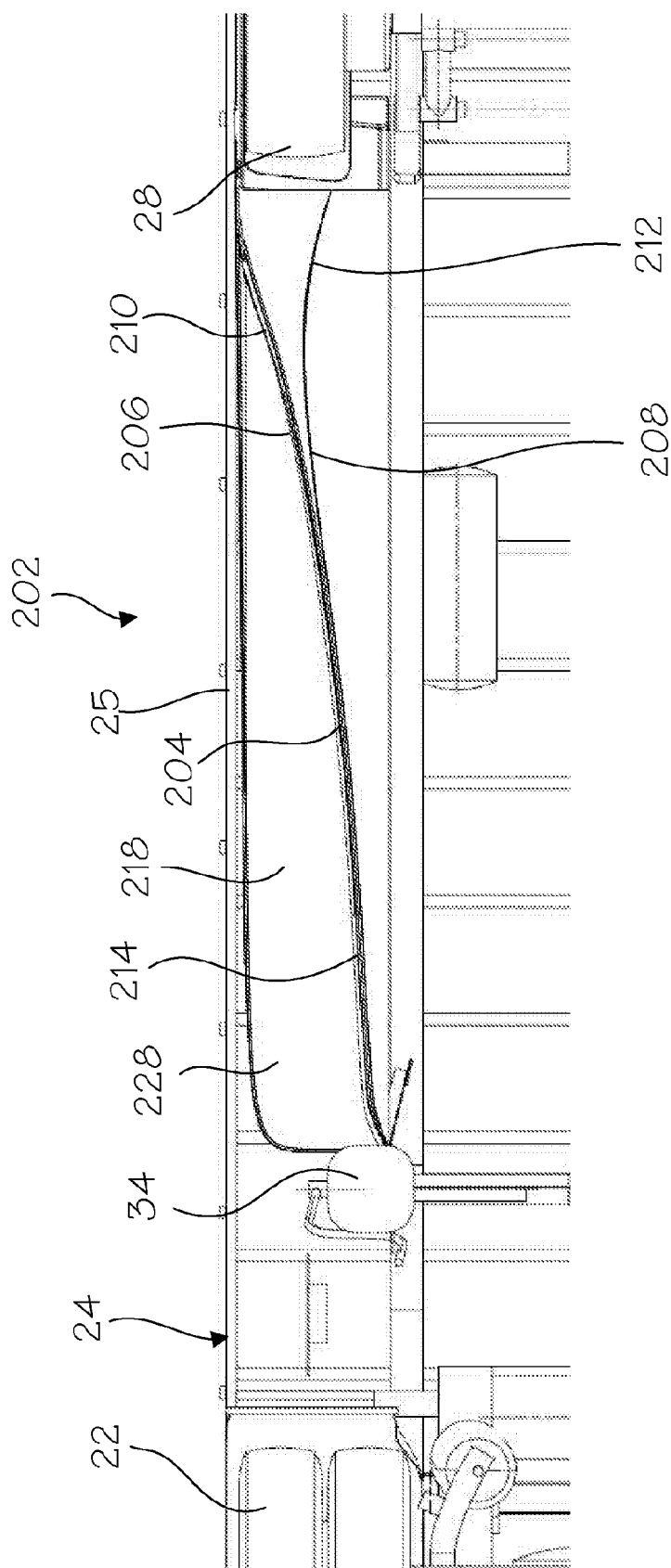
FIG. 12 is a bottom view of the region of the truck shown in FIG. 10.

FIGS. 10 to 12 show one of the second drag reduction devices 202 arranged on the left-hand-side of the underside of the trailer 6. The second drag reduction devices 202 are identical, although mirrored in construction, and are arranged to be fitted to opposite sides of the trailer 6. For ease of reference, only the left-hand-side drag reduction device 202 will be described.

The second drag reduction device 202 comprises an elongate strake 204 which extends from an inboard position behind the rear wheels 20, 22 of the tractor 4, which in the embodiment shown is immediately behind the landing gear 34, to an outboard position at the front of the forward-most wheel 28 of the trailer 6. The strake 204 has an outboard aerodynamic surface 206 on the outboard side of the strake 204 and an inboard aerodynamic surface 208 on the inboard side of the strake 204.

The strake 204 has an outboard lower edge 210, which extends along the length of the outboard aerodynamic surface 206, and an inboard lower edge 212 which extends along the length of the inboard aerodynamic surface 208. The outboard and inboard edges 210, 212 combine to form a single common edge 214 at the forward portion of the strake 204. The common edge 214 extends rearwardly, and curves in the outboard direction, from the front of the strake 204 to a position which is at a distance of between half and two thirds of the length of the strake 204 from the front of the strake 204. The inboard and outboard edges 210, 212 then diverge.

The inboard edge 212 curves away from the outboard edge 210 in the inboard direction and towards the inside of the wheel 28. The outboard edge 210 curves further in the outboard direction away from the inboard edge 212 and towards the outside of the wheel 28. The strake 204 is slender in the region of the common edge 214 before thickening from the position at which the outboard and inboard edges 210, 212 diverge. It will be appreciated that the inboard and outboard edges 210, 212 may diverge from the front of the strake 204 such that there is no common edge.

The outboard aerodynamic surface 206 extends vertically upwardly from the common edge 214 and the outboard edge 210 before curving outwardly towards the periphery of the loading bed 24 of the trailer 6. The outboard aerodynamic surface 206 curves concavely from the top of the vertical portion of the outboard aerodynamic surface 206 before reversing curvature, and curving back in a convex curve towards the loading bed 24 so that an upper edge of the outboard aerodynamic surface 206 joins the loading bed 24 at a peripheral edge 25 of the loading bed 24. The outboard aerodynamic surface 206 may be flat in a region between the concave and convex curved portions. It will be appreciated that at least part of the outboard aerodynamic surface 206 may the join the loading bed 24 inward of the peripheral edge 25 such that there is a small overhang of the loading bed 24 above the outboard aerodynamic surface 206 (as shown at the front of the second drag reduction device 202 shown in FIG. 12). The distance of the outboard edge 210 from the peripheral edge 25 of the loading bed 24 at the front of the strake 204 is greater than the distance of the outboard edge 210 from the peripheral edge of the loading bed 24 at the rear of the strake 204. Consequently, the extent and/or degree of curvature of the outboard aerodynamic surface 206 is greater towards the front of the strake 204 than towards the rear.

Figure 23:
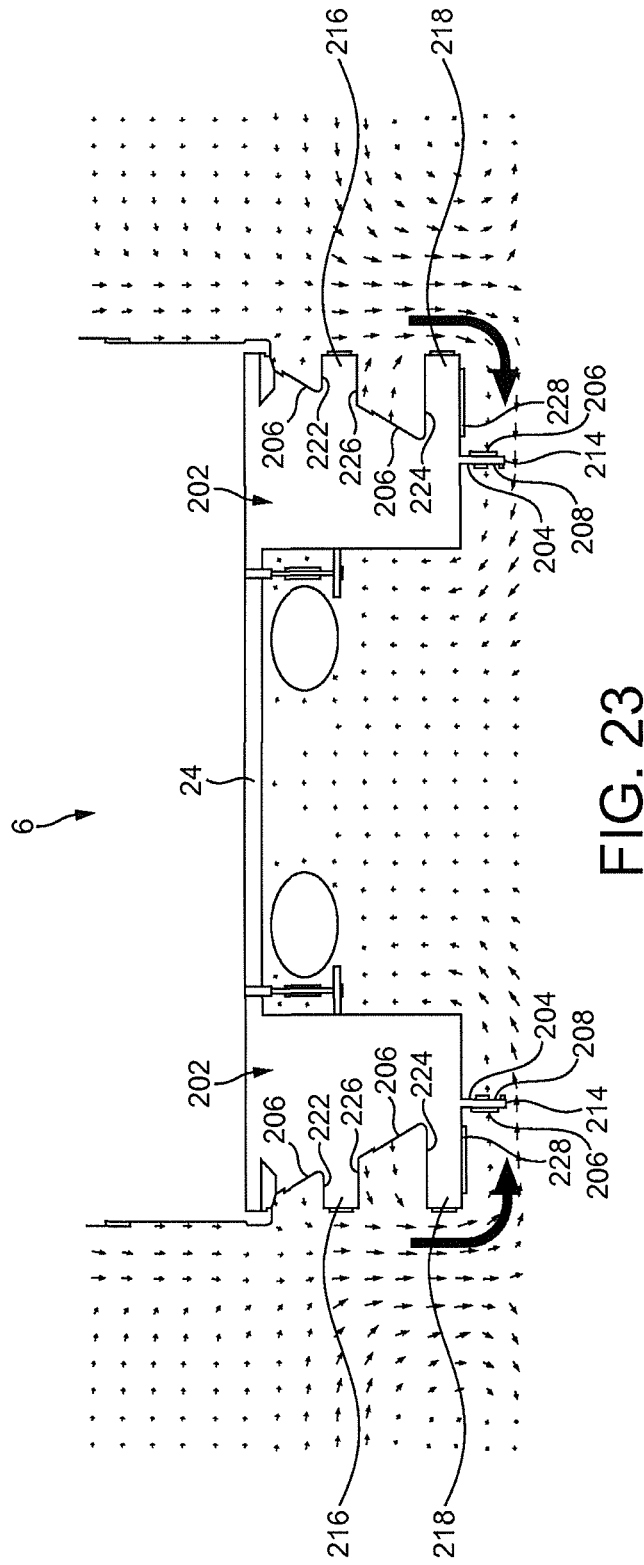
FIG. 23 is a schematic representation of a cross section through a region a truck corresponding that truck shown in FIG. 10 indicating flow.

The inboard aerodynamic surface 208 extends vertically upwardly from the common edge 214 and the inboard edge 212. As shown in FIG. 23 (which shows a cross section of the second drag reduction device 202 in a plane perpendicular to the longitudinal direction of the truck 2), the inboard aerodynamic surface 208 then extends horizontally from a level which corresponds to the lower rail of an impact structure (described below) before continuing upwardly to the underside of the loading bed 24.

The second drag reduction device 202 further comprises an impact structure, in the form of two rails 216, 218 which extend from the front of the strake 204 to the rear of the strake 204. The rails 216, 218 extend in a direction which is substantially parallel to the longitudinal direction of the trailer 6. The rails 216, 218 comprise an upper rail 216 and a lower rail 218. The rails 216, 218 project outwardly from the outboard aerodynamic surface 206 such that the outer periphery of each rail 216, 218 lies substantially in the vertical plane in which the peripheral edge 25 of the loading bed 24 extends. The rails 216, 218 are connected by a strut 220 which connects the forward portions of the rails 216, 218. The rails 216, 218 and the strut 220 are configured to withstand a predetermined lateral force exerted on the rails 216, 218. The rails 216, 218 segment the outer aerodynamic surface 206 into a lower section, mid section and upper section.

Each rail 216, 218 has a respective upper surface 222, 224 and a lower surface 226, 228, the edges of which abut the outer aerodynamic surface 206.

Figure 13:
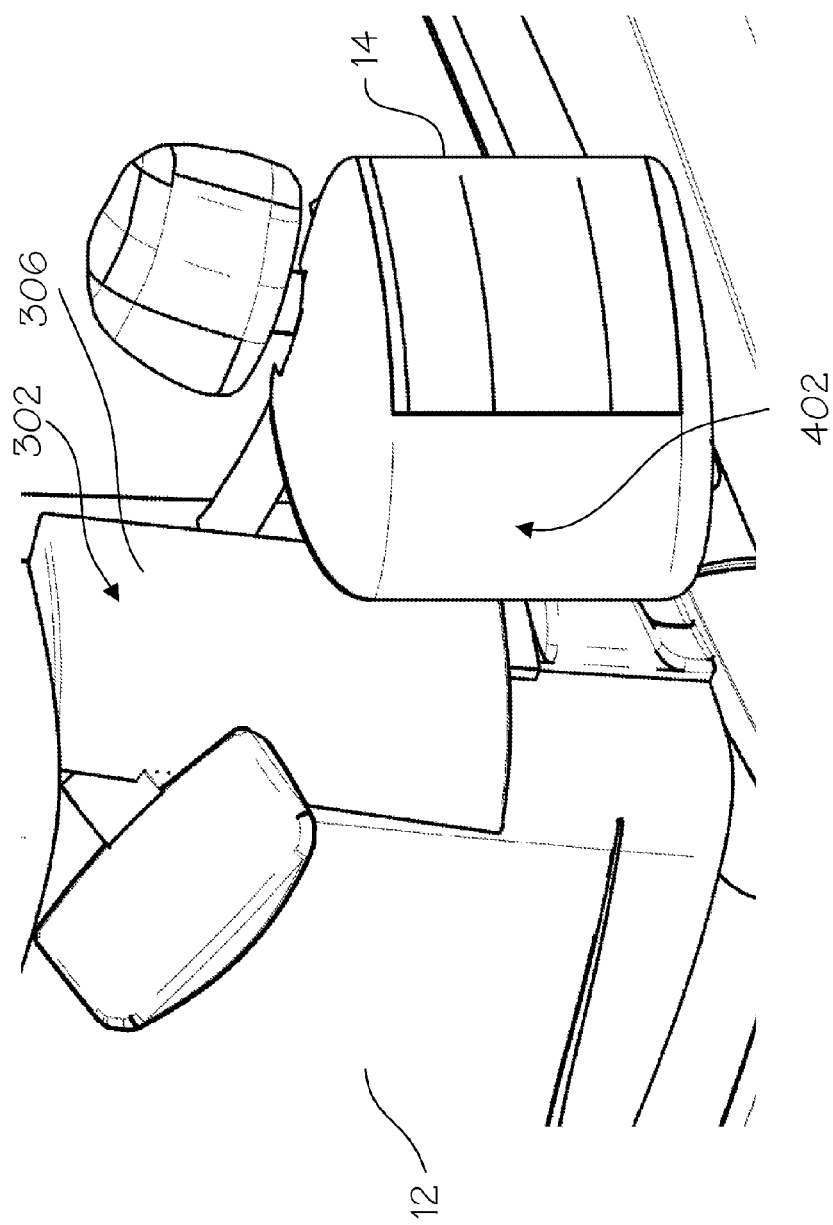
FIG. 13 is a partial perspective view of a truck corresponding to the truck shown in FIG. 1 in the region of a side mirror.
Figure 14:
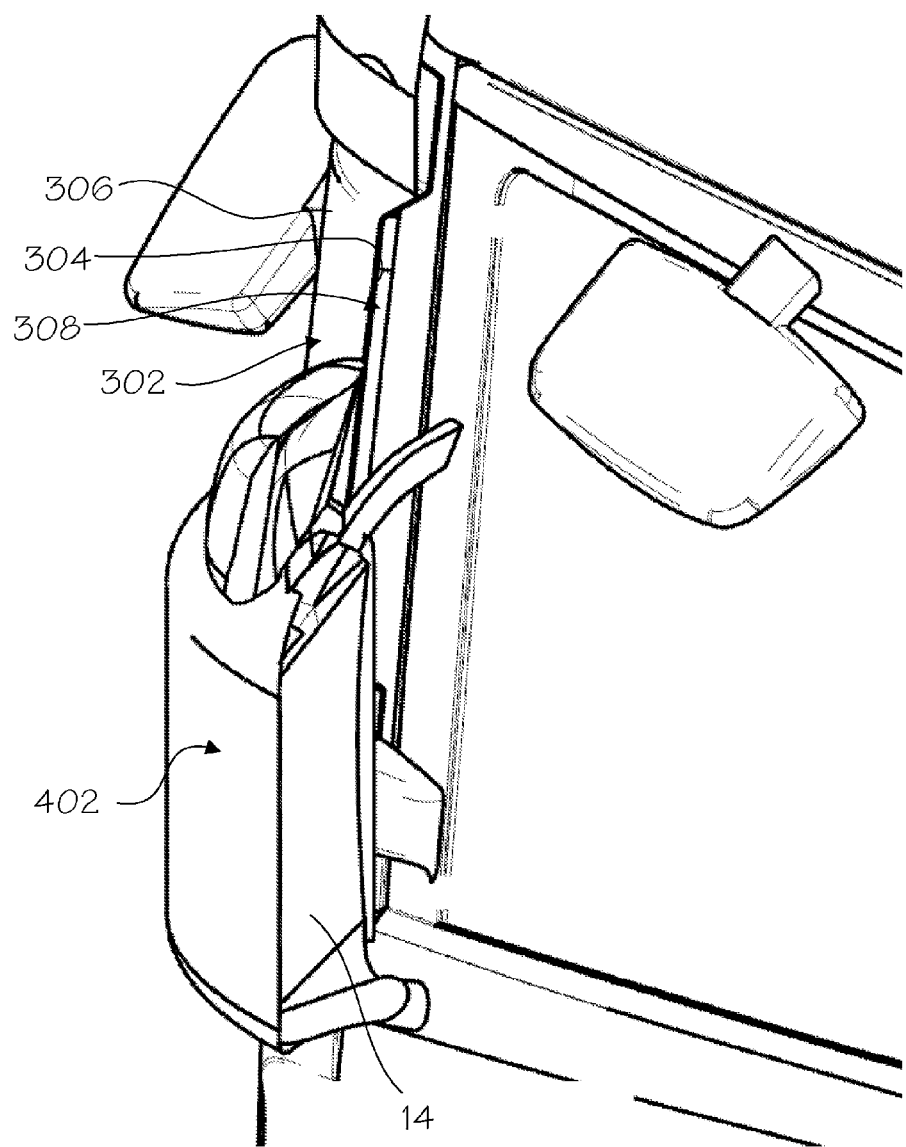
FIG. 14 is a partial perspective view of the region of the truck shown in FIG. 13 from a different perspective.

FIGS. 13 and 14 show one of the cabin turning vanes 302 and one of the mirror fairings 402. For ease of reference, only the left-hand-side cabin turning vane 302 and mirror fairing 402 will be described.

The cabin turning vane 302 comprises an inner concave surface 304 which faces towards the tractor 4 and an outer convex surface 306 which faces away from the tractor 4. The turning vane 302 is spaced away from the tractor 4 in a forward and outboard direction and arranged with respect to the tractor 4 such that the concave surface 304 and the tractor 4 define a divergent flow passage 308 which extends around the front corner of the tractor 4 adjacent the windscreen 12.

The mirror fairing 402 is arranged to cover the front portion of the mirror 14. The mirror fairing 402 is configured to guide oncoming flow each side of the mirror 14, and to smooth flow over the mirror 14 such that the amount of flow separation downstream of the mirror 14 is reduced.

Figure 15:
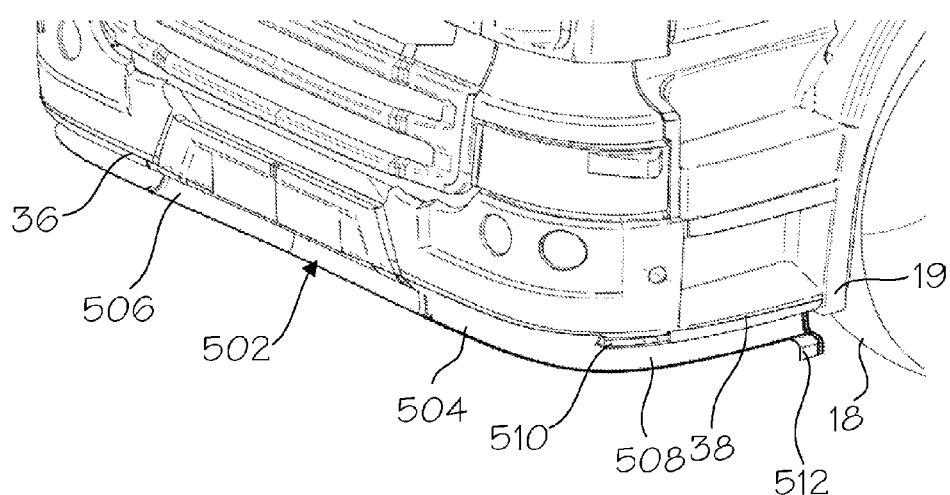
FIG. 15 is a partial perspective view of a truck corresponding to the truck shown in FIG. 1 in the region of a spoiler.
Figure 16:
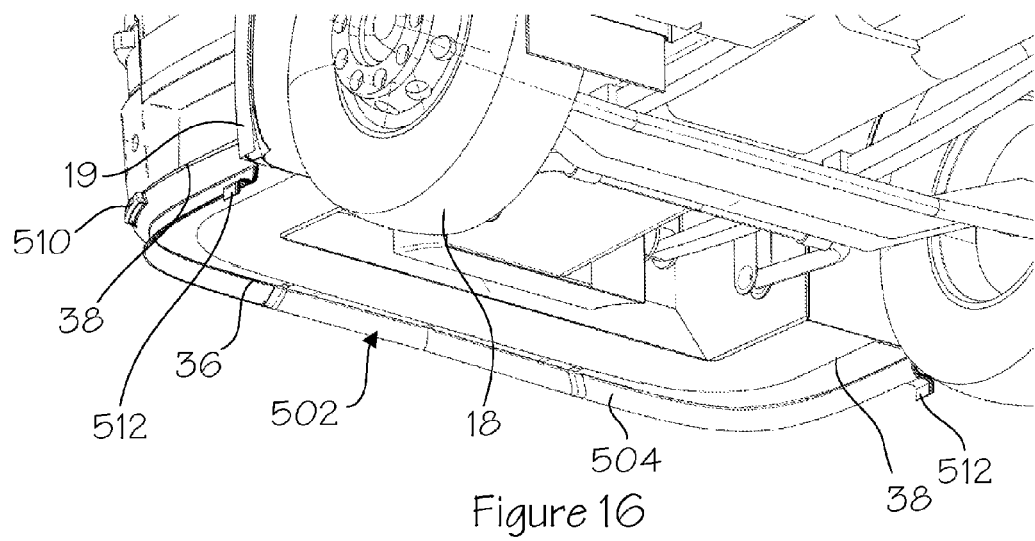
FIG. 16 is a partial perspective view of the region of the truck shown in FIG. 15 from a different perspective.

FIGS. 15 and 16 show the spoiler 502 arranged on a lower front portion of the tractor 4. The spoiler 502 comprises a fence 504 which extends downwardly from a peripheral edge 36, 38 of the tractor 4. The fence 504 extends across the full extent of a front portion 36 of the peripheral edge and rearwardly along side portions 38 of the peripheral edges on opposite sides of the tractor 4. Each end of the fence 504 extends rearwardly on a respective side of the tractor 4 to a wheel arch 19 of a front wheel 18.

The portion of the fence 504 which extends along the front portion 36 of the peripheral edge curves downwardly from the edge 36 and forward such that the fence 504 provides a concave forward facing surface 506. The portions of the fence 504 extending along the side portions 38 of the peripheral edge extend downwardly from the edge and curve in the outboard direction to form concave outboard surfaces 508.

In the embodiment shown, the spoiler 502 further comprises a forward mount 510 and a rearward mount 512 to which the first drag reduction device 102 shown in FIGS. 6 to 9 can be secured, for example as shown in FIGS. 1 to 5, such that flexing of the first drag reduction device 102 is inhibited. It will be appreciated that the mounts could be dispensed with if the spoiler 502 is not used with the first drag reduction devices 102.

Figure 17:
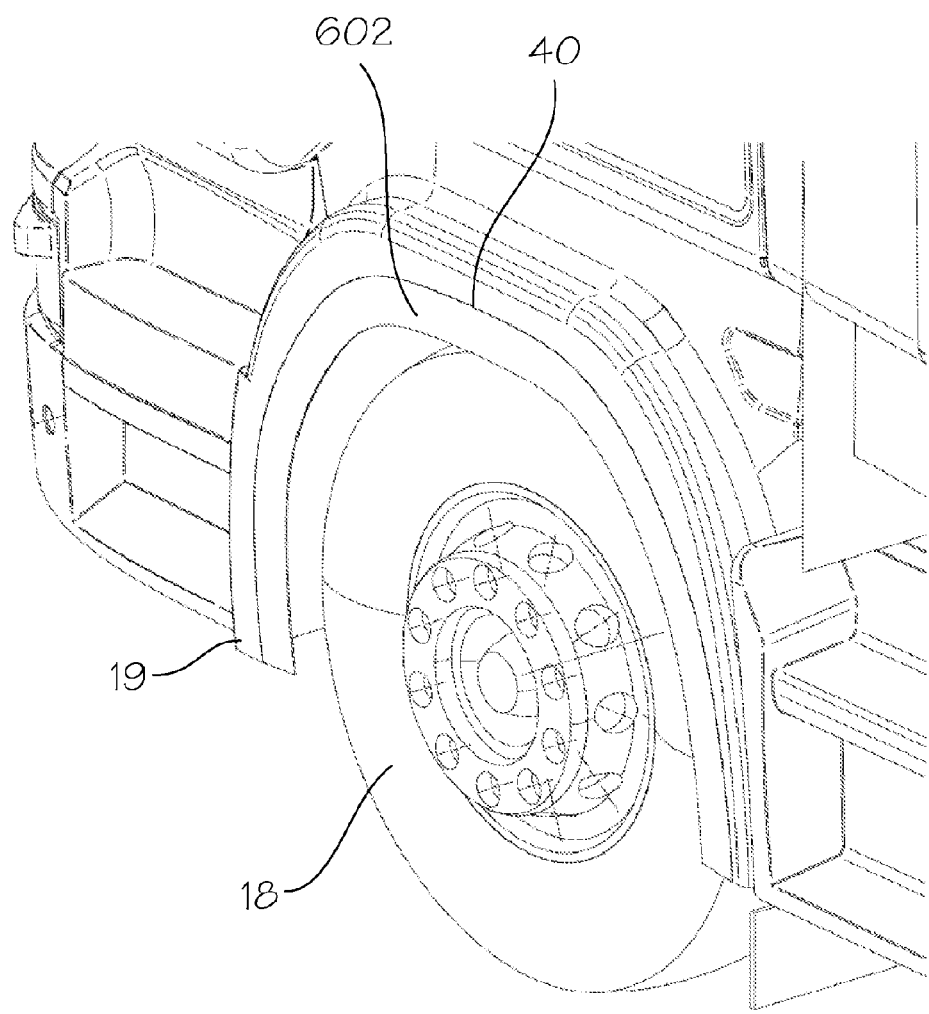
FIG. 17 is a partial perspective view of a truck corresponding to the truck shown FIG. 1 in the region of a wheel arch extension.

FIG. 17 shows one of one of the wheel arch extensions 602. For ease of reference, only the left-hand-side wheel arch extension 602 will be described. The wheel arch extension 602 extends along a peripheral edge 40 of the wheel arch 19. The wheel arch extension 602 projects inwardly from the peripheral edge 40. The wheel arch extension 602 is arranged to inhibit flow under the wheel arch 19. The wheel arch extension 602 is configured to be fitted to the underside of the wheels arch 19.

Figure 18:
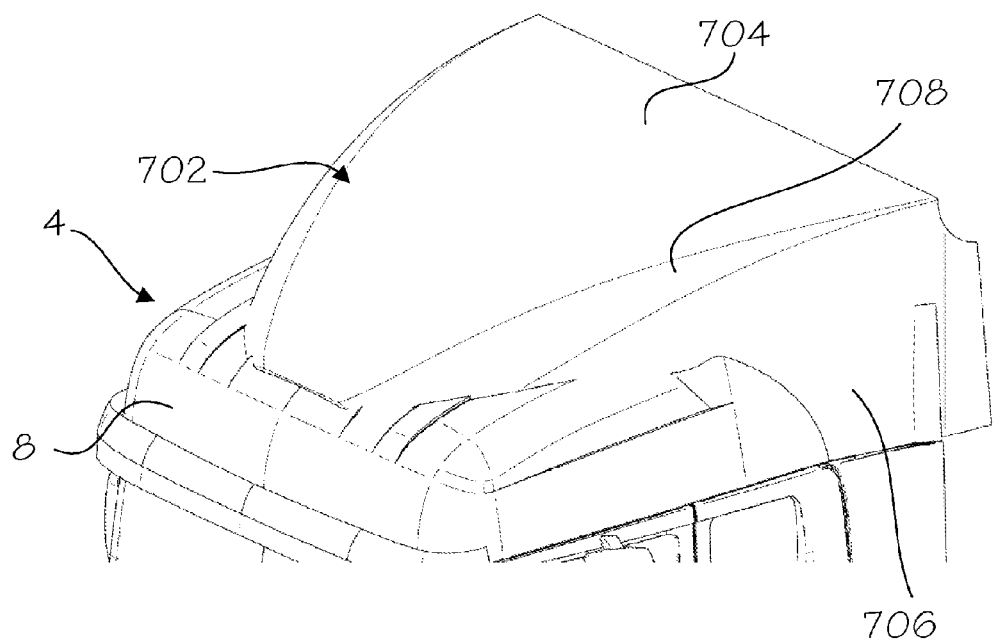
FIG. 18 is a partial perspective view of a truck corresponding to the truck shown FIG. 1 in the region of a roof spoiler.
Figure 19:
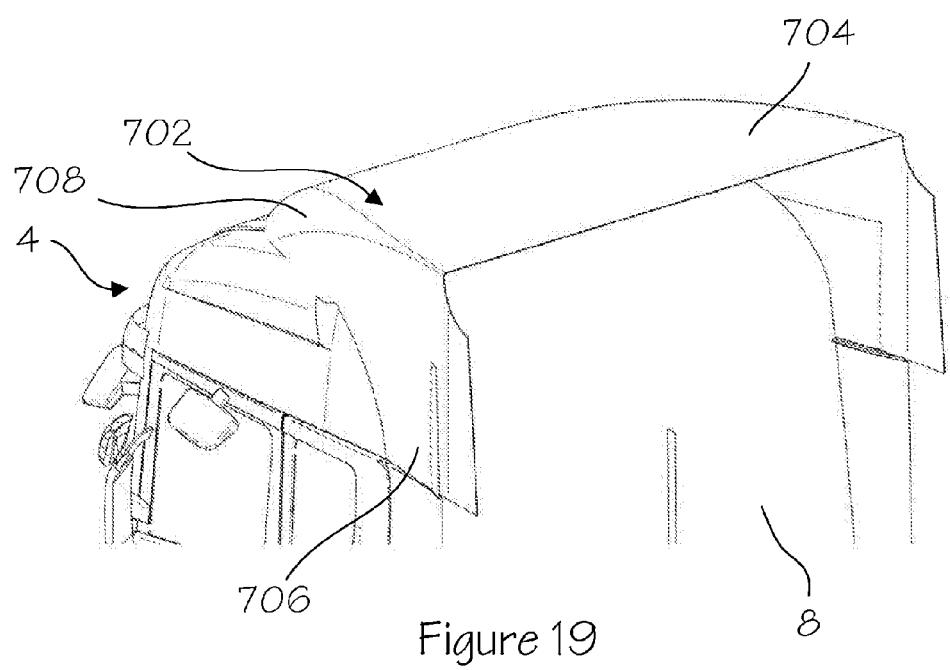
FIG. 19 is a partial perspective view of the region of the truck shown in FIG. 18 from a different perspective.

FIGS. 18 and 19 show the roof spoiler 702. The roof spoiler 702 has an upper aerodynamic surface 704, a side aerodynamic surface 706 on each side of the spoiler 702 and inclined aerodynamic surfaces 708 disposed respectively between each side surface 706 and the upper surface 704. The inclined surfaces 708 extend upward and rearward from the front of the spoiler 702 and taper in the rearward direction.

The spoiler 702 is arranged on the roof of the tractor 4 such that oncoming flow is guided upwardly over the trailer 6 by the upper surface 704 and upwardly and outboard of the trailer by the inclined surfaces 708.

Figure 21:
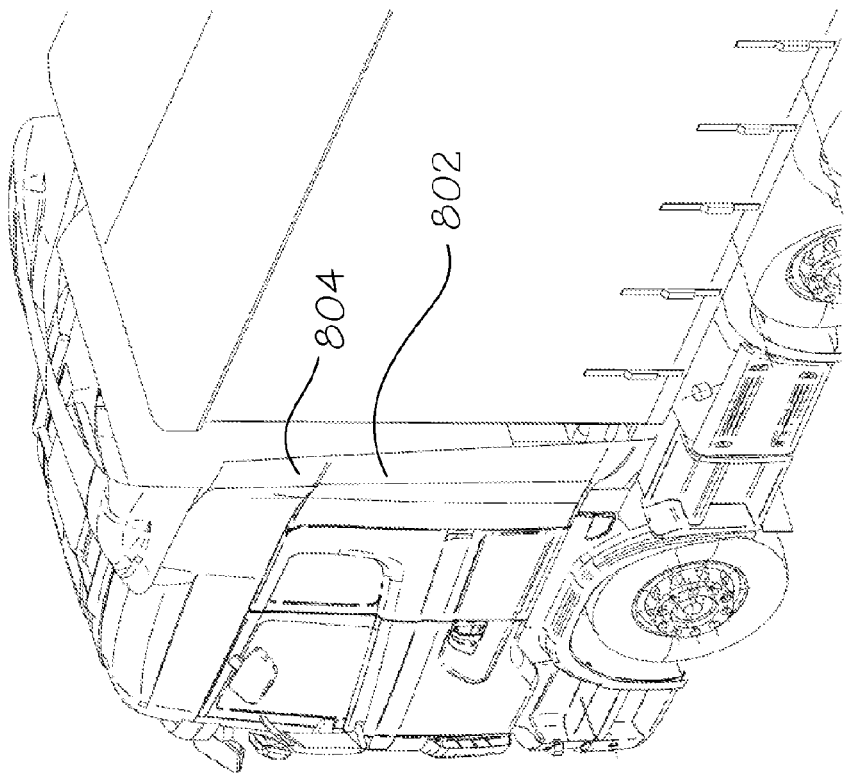
FIG. 21 is a partial perspective view of the region of the truck shown in FIG. 20 from a different perspective.
Figure 20:
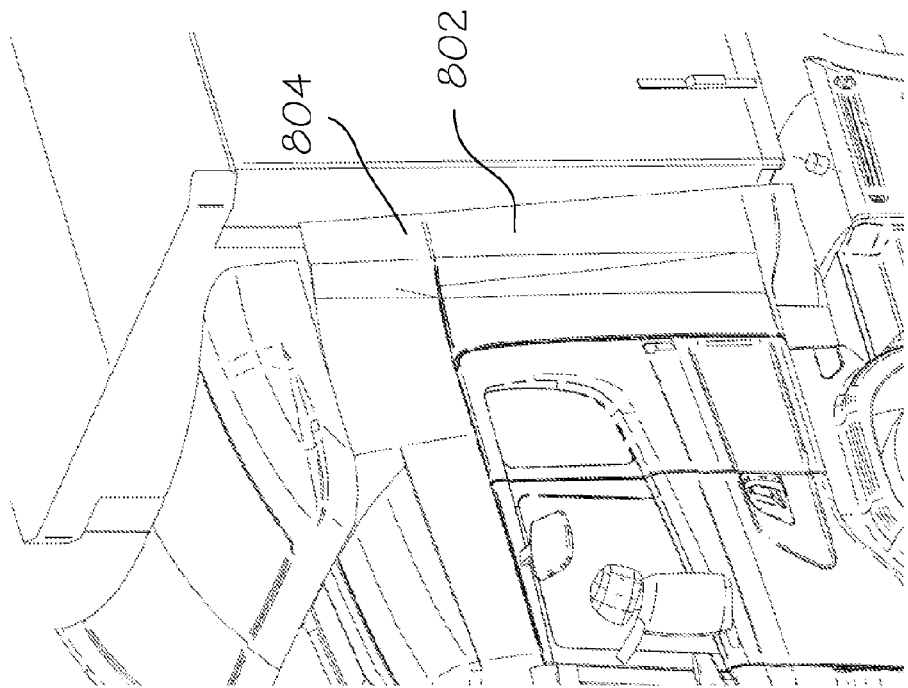
FIG. 20 is a partial perspective view of a truck corresponding to the truck shown FIG. 1 in the region of a cabin deflector.

FIGS. 20 and 21 show one of the cabin deflectors 802. For ease of reference, only the left-hand-side cabin deflector 802 will be described. The cabin deflector 802 comprises an elongate panel 804 which is disposed at the rear of the cabin 10 and extends in a vertical direction. The panel 804 is inclined with respect to the longitudinal direction of the truck 2 to deflect air outboard of the trailer 6.

Figure 22:
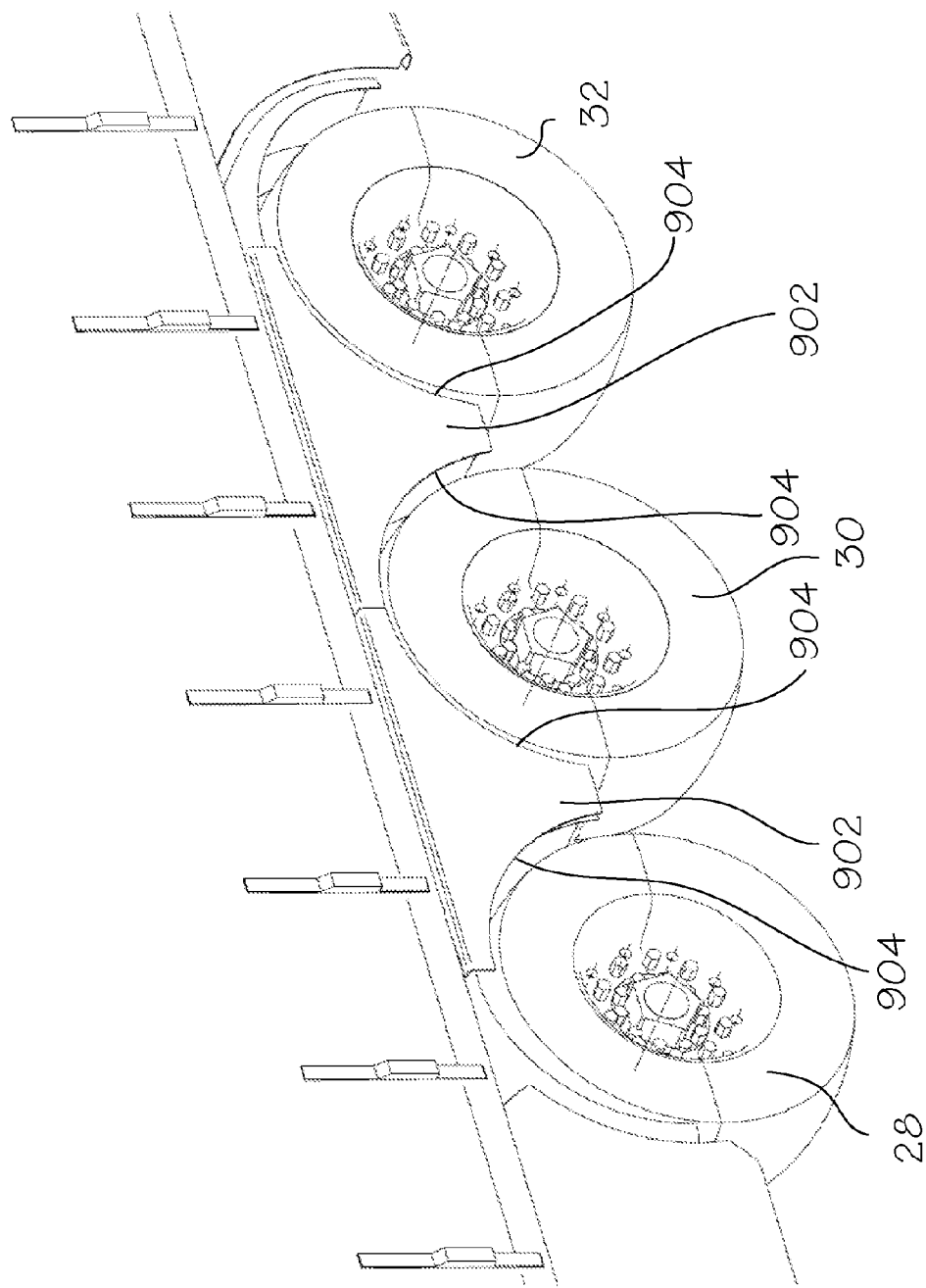
FIG. 22 is a partial perspective view of a truck corresponding to the truck shown FIG. 1 in the region of wheel arch panels.

FIG. 22 shows two of the wheel arch panels 902. Each wheel arch panels 902 has curved peripheral edges 904 at opposite ends of the panel 902 which have a curvature which corresponds to the curvature of the wheels 28, 30, 32. The edges 904 are therefore profiled such that each panel 902 fits between adjacent wheels 28, 30 and 30, 32 to inhibit flow between the wheels 28, 30, 32.

In use, the truck 2 is driven forward so that there is an oncoming airflow towards the truck 2. The oncoming air is displaced by the tractor 4 over the top, underneath and around the sides of the tractor 4.

Referring to FIGS. 6 to 9, air displaced towards the sides of the tractor 4 in the direction of the first drag reduction device 102 is guided by the turning vane 106, through the flow passage 134, and around the corner of the bumper 16 of the tractor 4.

The turning vane 106 reduces the adverse pressure gradient experienced by the oncoming flow at the front corner of the tractor 4 and so prevents, or at least delays and reduces, separation of the oncoming flow from the corner of the tractor 4.

Oncoming flow arriving at the vortex generating vane 110 is, compared with the oncoming flow arriving at the turning vane 106, relatively undisturbed by the body of the tractor 4. In normal operating conditions, the oncoming flow is in a longitudinal direction with respect to the truck 2.

Air is turned by the leading portion 112 of the vortex generating vane 110 towards the trailing portion 114. Flow is therefore diverted in the outboard direction, away from the front wheel 18 of the tractor 4. The turning action of the concave surface 116 compresses the air which causes an increase in the static pressure acting on the concave surface 116. The air which flows over the convex surface 118 expands thereby reducing the static pressure acting on the convex surface 118. Consequently, there is a pressure difference between the air flowing over the concave surface 116 and the convex surface 118.

The air is directed by the concave surface 116 along the inner surface 117 of the trailing portion 114. The pressure difference between the air flowing over the inner surfaces 116, 117 and the air flowing over the outer surfaces 118, 119 causes air to spill over the lower vortex generating edge 120, 122 in the outboard direction. The air rolls up into a lower vortex which rotates about a nominal vortex axis in a counter-clockwise direction (as viewed from the front of the truck 2). The lower vortex axis extends in substantially the same direction as the second portion 122 of the vortex generating edge. It is expected that the lower vortex axis would extend along the side of the truck, in a direction which is substantially parallel, for example at an angle of less than 10 degrees, with respect to the longitudinal direction of the truck 2.

The counter-clockwise rotation of the upper vortex draws air inwardly and/or downwardly along the side of the truck 2. This prevents or reduces expansion and of the wake formed at the side of the truck 2. The lower vortex therefore suppresses the wake of the truck 2. By suppressing the wake, the energy losses in the flow are reduced, thereby reducing drag acting on the truck. The lower vortex expands as it travels along the side of the truck 2 drawing air downwardly from the upper part of the wake of the truck 2.

It will be appreciated that the effectiveness of the vortex generator 104 is dependent on the strength of the lower vortex. The vortex generator may be adapted, for example by increasing the length of the vortex generating vane 110, in particular by increasing the length of the trailing portion 114 and the second portion of the vortex generating edge 122; increasing the height (i.e. span) of the vortex generating vane 110; and/or increasing the curvature of the leading portion 112 of the vortex generating vane 110 to vary the strength of the vortex produced.

In addition, air spills over the upper vortex generating edge 126 and rolls up into an upper vortex which rotate about a nominal vortex axis in a clockwise direction (as viewed from the front of the truck 2). The direction of the upper vortex axis extends in a direction which corresponds to the direction of the upper vortex generating edge 126. The upper vortex extends rearward such that it collides with the front wheel 18 of the tractor 4.

If the truck 2 is operated in conditions in which there is a crosswind across the truck 2 (i.e. the truck 2 is at a non-zero yaw angle with respect to the direction of the oncoming flow) such that the first drag reduction device 102 is on the leeward side of the truck 2, the increase in separation of the flow from the front corners of the tractor 4 which would be expected to occur is inhibited by the turning vane 106 and the vortex generating vane 110. In addition, the leading portion 112 of the vortex generating vane 110 remains effective in directing the air rearward towards the trailing portion 114 such that the lower vortex is still generated in a direction which is substantially parallel with the longitudinal direction of the truck 2. In addition, the crosswind increases the angle of incidence of the vortex generating vane 110, thereby increasing the pressure difference between the inner surfaces 116, 117 and the outer surfaces 118, 119 which strengthens the lower vortex. The strengthened lower vortex is therefore still effective at suppressing the wake of the truck 2 in a crosswind.

Referring to FIGS. 10 to 12, at least some of the air flows underneath the truck 2 or along the sides of the truck 2. Air which flows along a side of the truck 2 past the rear-most wheel 22 of the tractor 4 is drawn inboard into a region of lower static pressure formed in the wake of the wheel 22 in front of the strake 204. It is expected that the air drawn inboard will be turbulent. In any case, in the present embodiment the air is drawn past the landing gear 34 which creates turbulence or further turbulates the flow.

At least some of the flow in the inboard direction may spill over the common edge 214 inboard of the strake 204. The flow of air in the inboard direction over the common edge 214 of the strake 204 reduces the amount of air directed by the strake 204 outboard of the trailer 6 and so reduces the size of the wake formed at the side of the trailer 6.

Turbulent air which does not immediately spill over the common edge 214 is guided by the outboard aerodynamic surface 206 in a rearward and outboard direction. The outboard aerodynamic surface 206 smoothes the air as it travels rearward along the surface 206 thereby reducing the amount of turbulence and hence energy losses in the flow. In addition, the outboard aerodynamic surface 206 compresses the air as it travels rearward and outboard thereby increasing the static pressure outboard of the strake 204. The increase in static pressure outboard of the strake 204 with respect to the pressure inboard of the strake 204 creates a pressure difference across the strake 204 which causes the air to further spill over the common edge 214 and the outboard edge 210 in the inboard direction. Air is therefore drawn downwardly from the sides of the trailer 6 and inboard towards the strake 204 as indicated by the arrows shown in FIG. 23 (which shows the direction of flow with respect to the second drag reduction device in a plane perpendicular to the longitudinal direction of the truck 2). By drawing air inboard towards the underside of the trailer 6, turbulent (i.e. low energy), flow is removed from the wake at the side of the trailer 6. Consequently, the amount of turbulence and size of the wake formed at the side of the trailer 6 is reduced, thereby reducing drag acting on the truck 2.

Air which does not spill over the common edge 214 or the outboard edge 210 is smoothed further and directed outboard past the wheels 28, 30, 32 of the trailer 6. Consequently, any wake formed at the side of the trailer 6 downstream of the second flow reduction device 202 and the wheels 28, 30, 32 is less turbulent and/or smaller which results in a reduction in drag acting on the truck 2. Furthermore, the reduction in pressure acting on the forward facing surfaces of the forward-most wheel 28 of the trailer 6 contributes to a significant reduction in the drag acting on the truck 2.

The upward curvature in the outboard direction of the outboard aerodynamic surface 206 directs any upward flow over the outboard aerodynamic surface 206 outboard towards one of the rails 216, 218 or towards the peripheral edge 25 of the loading bed 24. By extending the outboard aerodynamic surface 206 towards the peripheral edge 25 of the loading bed 24, drag on the underside of the loading bed 24 is prevented. In addition, downward flow from the sides of the trailer canopy 26 over the peripheral edge 25 of the loading bed 24 which would increase drag on the underside of the trailer 6 is inhibited.

Air which flows underneath the trailer 6 along the inboard aerodynamic surface 208 is smoothed by the inboard aerodynamic surface 208 and is caused to expand by the curvature of the inboard aerodynamic surface 208 in the outboard direction along the common edge 214. This reduces the static pressure inboard of the strake 204 thereby increasing the amount of low energy flow over the common edge 214 in the inboard direction.

The inboard curvature of the inboard aerodynamic surface 208 along the inboard edge 212 away from the position at which the inboard and outboard edges 210, 212 diverge further smoothes the air flow and directs air inboard and past the wheels 28, 30, 32 of the trailer 6. Consequently, any wake formed underneath the trailer 6 downstream of the second flow reduction device 202 and the wheels 28, 30, 32 is less turbulent and/or smaller which results in a reduction in drag acting on the truck 2. The reduction in pressure acting on the forward facing surfaces of the wheel 28 contributes to a significant reduction in the drag acting on the truck 2.

Referring to FIGS. 13 and 14, air displaced towards the sides of the tractor 4 in the direction of the cabin turning vanes 302 is turned by the cabin turning vane 302 through the flow passage 308 and around the front corner of the tractor 4. By guiding the oncoming flow around the front corner of the tractor 4, separation of the flow from the corner of the tractor 4 is inhibited.

Air which arrives at the side mirrors 14 is smoothed by the mirror fairings 402 and diverted by the mirror fairings 402 over the side mirrors 14. Separation of the oncoming flow over the side mirrors 14 is therefore inhibited.

Referring to FIGS. 15 and 16, oncoming flow diverted by the front of the tractor 4 downwardly, or which arrives directly at the spoiler 502, is obstructed by the fence 504 and directed in a downward and forward direction by the concave forward facing surface 506 of the fence 504. The spoiler 502 therefore acts as a baffle which inhibits flow underneath the tractor 4 in the longitudinal direction of the truck 2. Furthermore, the fence 504 turbulates any flow which does flow underneath the tractor 4. The increase in turbulence downstream of the fence 504 reduces the total pressure (which is representative of the total energy) of flow which passes underneath the front of the tractor 4. Consequently, the static pressure on forward facing surfaces underneath the truck 2, for example the front of the wheels 18, 20, 22 of the tractor 4, is significantly reduced. The amount of pressure drag acting on the truck 2 is therefore reduced.

Referring to FIGS. 17 and 22, the wheel arch extensions 602 and the wheel arch panels 902 smooth flow over the wheels 18, 28, 30, 32 and inhibit flow in the inboard direction.

Referring to FIGS. 18 to 21, air displaced over the top of the tractor 4 is diverted by the roof spoiler 702 and cabin deflectors 802 over the top of the trailer 6 and around the sides of the trailer 6 thereby inhibiting separation of the oncoming flow from the tractor 4 and the trailer 6.

It will be appreciated that the drag reduction components would be effective if the truck 2 were placed in a wind tunnel with air driven over the truck 2.

It will be appreciated that, where suitable, the drag reduction components could be fitted to other types of haulage or freight vehicles, such as other types of wheeled vehicles including fixed-bed trucks and trains, or water craft to reduce drag acting of the vehicles during operation.

The invention claimed is:

1. A drag reduction device for a truck, the drag reduction device comprising:
    a vortex generator including:
        a vortex generating vane defined by a front exposed edge, a rear exposed edge, a lower vortex generating exposed edge and an upper vortex generating exposed edge, wherein the lower vortex generating exposed edge is defined by a first portion and a second portion, wherein the vortex generating vane comprises a leading portion and a trailing portion, wherein the leading portion is defined by the front exposed edge and the first portion of the lower vortex generating exposed edge, wherein the trailing portion is defined by the rear exposed edge, the second portion of the lower vortex generating exposed edge and the upper vortex generating exposed edge, wherein the leading portion is profiled to direct flow over the trailing portion, wherein the trailing portion is substantially planar, wherein the drag reduction device is arranged to cooperate with a front portion of the truck such that the trailing portion extends in a substantially longitudinal direction of the truck, with the lower vortex generating exposed edge being disposed below a bumper of the truck so that, in use, the lower vortex generating exposed edge generates a vortex below the bumper of the truck which rotates about an axis extending in the longitudinal direction of the truck, thereby suppressing a wake formed along a side of the truck.

2. The drag reduction device as claimed in claim 1, wherein the drag reduction device is arranged to cooperate with the truck such that the vortex generator generates the vortex outboard of the truck.

3. The drag reduction device as claimed in claim 1, wherein the drag reduction device is arranged to cooperate with the truck such that the vortex generator generates the vortex in front of a front wheel of the truck which is capable of suppressing a wake of the front wheel.

4. The drag reduction device as claimed in claim 1, wherein the trailing portion of the drag reduction device extends to a position which is adjacent a front wheel arch of the truck.

5. The drag reduction device as claimed in claim 1, wherein the trailing portion of the drag reduction device is at least 10 cm and not more than 100 cm in length.

6. The drag reduction device as claimed in claim 1, further including a coupling for coupling the drag reduction device to the truck.

7. The drag reduction device as claimed in claim 1, further including
a turning vane that extends substantially perpendicularly from the leading portion of the vortex generating vane, wherein the drag reduction device is arranged to cooperate with the truck such that the turning vane directs flow around a front corner of the truck to inhibit flow separation from the corner of the truck.

8. The drag reduction device as claimed in claim 1, wherein at least a portion of the drag reduction device is transparent or translucent.

9. The drag reduction device as claimed in claim 8, wherein the drag reduction device is arranged to cooperate with the truck such that an indicator light provided on the truck is visible through the translucent/transparent portion of the device.

10. An assembly, comprising:
a vehicle; and
at least one drag reduction device as claimed in claim 1 attached to the vehicle.

11. The assembly as claimed in claim 10, wherein the at least one drag reduction device includes two drag reduction devices attached to the vehicle, wherein the two drag reduction devices are arranged on opposite sides of the vehicle.

12. The assembly as claimed in claim 11, wherein the at least one drag reduction device is a portion of a drag reducing kit, wherein the drag reducing kit further includes at least one further drag reduction device arranged on:
an underside of the vehicle,
a cabin turning vane of the vehicle,
a mirror fairing of the vehicle,
a spoiler which is arranged to cooperate with a front lower peripheral edge of the vehicle,
a wheel arch extension of the vehicle,
a roof spoiler of the vehicle,
a cabin deflector of the vehicle, and
a wheel arch panel of the vehicle.

13. A method of operating the assembly of claim 10, comprising:
moving the vehicle over a predetermined distance such that the vortex generator of claim 1 generates a vortex.

14. A drag reduction device for a truck, the drag reduction device comprising:
a vortex generator, the vortex generator having a vortex generating vane;
wherein the vortex generating vane comprises a leading portion and a trailing portion which define a vortex generating edge, the leading portion being profiled to direct flow over the trailing portion and the trailing portion being substantially planar; and
wherein the drag reduction device is arranged to cooperate with a front portion of the truck such that the trailing portion extends in a substantially longitudinal direction of the truck, with the vortex generating edge being disposed below the front portion of the truck so that, in use, the vortex generating edge generates a vortex below a body of the truck which rotates about an axis extending in the longitudinal direction of the truck, thereby suppressing a wake formed along a side of the truck;
wherein at least a portion of the drag reduction device is transparent or translucent; and
wherein the drag reduction device is arranged to cooperate with the truck such that an indicator light provided on the truck is visible through the translucent/transparent portion of the device.

15. An apparatus, comprising:
a drag reduction device including a vortex generator defined by
a vortex generating vane, wherein the vortex generating vane is defined by a front exposed edge, a rear exposed edge, a lower vortex generating exposed edge and an upper vortex generating exposed edge, wherein the lower vortex generating exposed edge is defined by a first portion and a second portion, wherein the vortex generating vane is further defined by
a leading portion, and
a trailing portion, wherein the leading portion is defined by the front exposed edge and the first portion of the lower vortex generating exposed edge, wherein the trailing portion is defined by the rear exposed edge, the second portion of the lower vortex generating exposed edge and the upper vortex generating exposed edge.

16. The apparatus of claim 15, wherein the leading portion is profiled to direct air flow over the trailing portion, wherein an outer surface of the leading portion is defined by a convex surface, wherein an outer surface of the trailing portion is defined by a substantially planar surface.

17. The apparatus of claim 15, further comprising:
a turning vane that extends substantially perpendicularly from the leading portion of the vortex generating vane.

18. The apparatus of claim 17, further comprising:
a coupling, wherein the coupling extends from an upper panel of the turning vane, wherein the vortex generating vane extends from a lower panel of the turning vane.

19. The apparatus of claim 18, wherein the upper panel of the turning vane is transparent or translucent.

20. The apparatus of claim 15, wherein the trailing portion of the drag reduction device is at least 10 cm and not more than 100 cm in length.

21. An assembly, comprising:
a vehicle; and
at least one drag reduction device attached to the vehicle, wherein the at least one drag reduction device includes
a vortex generator defined by
a vortex generating vane, wherein the vortex generating vane is defined by a front exposed edge, a rear exposed edge, a lower vortex generating exposed edge and an upper vortex generating exposed edge, wherein the lower vortex generating exposed edge is defined by a first portion and a second portion, wherein the vortex generating vane is defined by
a leading portion, and
a trailing portion, wherein the leading portion is defined by the front exposed edge and the first portion of the lower vortex generating exposed edge, wherein the trailing portion is defined by the rear exposed edge, the second portion of the lower vortex generating exposed edge and the upper vortex generating exposed edge.

22. The assembly of claim 21, wherein the leading portion is profiled to direct air flow over the trailing portion, wherein an outer surface of the leading portion is defined by a convex surface, wherein an outer surface of the trailing portion is defined by a substantially planar surface.

23. The assembly of claim 21, further comprising:
a turning vane that extends substantially perpendicularly from the leading portion of the vortex generating vane.

24. The assembly of claim 23, further comprising:
a coupling, wherein the coupling extends from an upper panel of the turning vane, wherein the vortex generating vane extends from a lower panel of the turning vane.

25. The assembly of claim 24, wherein the upper panel of the turning vane is transparent or translucent.

26. The assembly of claim 25, wherein the transparent or translucent upper panel of the turning vane is arranged over an indicator light of the vehicle.

27. The assembly of claim 23, wherein the turning vane is arranged over a front corner of the vehicle.

28. The assembly of claim 21, wherein the trailing portion of the at least one drag reduction device is at least 10 cm and not more than 100 cm in length.

29. The assembly of claim 21, wherein the at least one drag reduction device includes at least two drag reduction devices, wherein the two drag reduction devices are arranged on opposite sides of the vehicle.

30. The assembly of claim 21, wherein the at least one drag reduction device is a portion of a drag reducing kit, wherein the drag reducing kit further includes at least one further drag reduction device arranged on:
an underside of the vehicle,
a cabin turning vane of the vehicle,
a mirror fairing of the vehicle,
a spoiler that is arranged to cooperate with a front lower peripheral edge of the vehicle,
a wheel arch extension of the vehicle,
a roof spoiler of the vehicle,
a cabin deflector of the vehicle, and
a wheel arch panel of the vehicle.

31. The assembly of claim 21, wherein the trailing portion of the vortex generating vane extends to a position that is adjacent a front wheel arch of the vehicle.

32. A method of utilizing a vehicle and at least one drag reduction device attached to the vehicle, wherein the at least one drag reduction device includes a vortex generator defined by a vortex generating vane, wherein the vortex generating vane is defined by a front exposed edge, a rear exposed edge, a lower vortex generating exposed edge and an upper vortex generating exposed edge, wherein the lower vortex generating exposed edge is defined by a first portion and a second portion, wherein the vortex generating vane is defined by a leading portion, and a trailing portion, wherein the leading portion is defined by the front exposed edge and the first portion of the lower vortex generating exposed edge, wherein the trailing portion is defined by the rear exposed edge, the second portion of the lower vortex generating exposed edge and the upper vortex generating exposed edge, the method comprising:
moving the vehicle over a predetermined distance; and
utilizing the vortex generator of the at least one drag reduction device of for generating a vortex.

33. The method of claim 32, further comprising:
arranging the at least one drag reduction device over the vehicle such that the trailing portion of the vortex generating vane of the vortex generator extends in a substantially longitudinal direction over the vehicle.

34. The method of claim 33, wherein the arranging step further includes:
arranging at least one of the upper vortex generating exposed edge and the lower vortex generating exposed edge below a bumper of the vehicle for
generating the vortex below the bumper of the vehicle that rotates about an axis extending in a longitudinal direction of the vehicle for
suppressing a wake formed along a side of the vehicle.

35. The method of claim 33, wherein the arranging step further includes:
arranging at least one of the upper vortex generating exposed edge and the lower vortex generating exposed edge below a bumper of the vehicle for
generating the vortex outboard of the vehicle.

36. The method of claim 33, wherein the arranging step further includes:
arranging at least one of the upper vortex generating exposed edge and the lower vortex generating exposed edge below a bumper of the vehicle for
generating the vortex in front of a front wheel of the vehicle for
suppressing a wake of the front wheel.

* * * * *